(12) United States Patent
Williams

(10) Patent No.: US 9,447,852 B2
(45) Date of Patent: Sep. 20, 2016

(54) GEARING SYSTEM AND METHOD OF USE

(71) Applicant: Paul Thomas Williams, Cedar Park, TX (US)

(72) Inventor: Paul Thomas Williams, Cedar Park, TX (US)

(*) Notice: Subject to any disclaimer, the term of this patent is extended or adjusted under 35 U.S.C. 154(b) by 268 days.

(21) Appl. No.: 14/264,730

(22) Filed: Apr. 29, 2014

(65) Prior Publication Data

US 2014/0323253 A1    Oct. 30, 2014

Related U.S. Application Data

(60) Provisional application No. 61/817,470, filed on Apr. 30, 2013.

(51) Int. Cl.
| | | |
|---|---|---|
| *F16H 9/24* | (2006.01) | |
| *B62M 9/04* | (2006.01) | |
| *B62M 9/00* | (2006.01) | |

(52) U.S. Cl.
CPC ............ *F16H 9/24* (2013.01); *B62M 9/04* (2013.01); *B62M 2009/002* (2013.01)

(58) Field of Classification Search
CPC .... B62M 2009/002; B62M 9/04; F16H 9/24
USPC ...................................... 474/49, 69
See application file for complete search history.

(56) References Cited

U.S. PATENT DOCUMENTS

| | | | | |
|---|---|---|---|---|
| 4,129,044 A | * | 12/1978 | Erickson ................ | B62M 9/08 280/236 |
| 4,842,569 A | * | 6/1989 | Orr ........................ | B62M 1/36 474/140 |
| 5,980,412 A | * | 11/1999 | Smith ..................... | B62M 9/04 280/236 |
| 6,497,634 B1 | * | 12/2002 | Bode ...................... | F16H 3/42 474/139 |
| 7,503,862 B2 | * | 3/2009 | Kaga ...................... | B62M 9/04 474/78 |
| 2005/0148416 A1 | * | 7/2005 | Naude .................... | B62M 9/08 474/49 |
| 2005/0263978 A1 | * | 12/2005 | Ascher .................. | B62K 15/006 280/261 |
| 2008/0214345 A1 | * | 9/2008 | Khan ..................... | F16G 13/06 474/231 |
| 2014/0162816 A1 | * | 6/2014 | Clopet ................... | F16H 9/10 474/49 |
| 2015/0251725 A1 | * | 9/2015 | Rockwood ............. | B62M 9/08 474/56 |

* cited by examiner

*Primary Examiner* — William E Dondero
*Assistant Examiner* — Robert T Reese
(74) *Attorney, Agent, or Firm* — Roman Aguilera, III

(57) ABSTRACT

Embodiments include a gear shifting system that eliminates the use of a derailleur and is capable of integrating with existing controls on the bike.

7 Claims, 42 Drawing Sheets

GEARING SYSTEM AND METHOD OF USE

CROSS-REFERENCE TO RELATED APPLICATIONS

This application claims the benefit under Title 35 United States Code §119(e) of U.S. Provisional Patent Application Ser. No. 61/817,470; Filed: Apr. 30, 2013, the full disclosure of which is incorporated herein by reference.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATING-BY-REFERENCE OF MATERIAL SUBMITTED ON A COMPACT DISC

Not applicable

SEQUENCE LISTING

Not applicable

FIELD OF THE INVENTION

The present invention generally relates to a system and method of use directed to gears. More specifically, the present invention relates to a system and method of use for shifting gears without a derailleur.

BACKGROUND OF THE INVENTION

Without limiting the scope of the disclosed system and method, the background is described in connection with a novel system and approach directed to gears.

Currently available gear shifting devices include internal hub gears. These internal hub gears are currently the only option for belt driven bicycles and are heavy (up to 4.5 lbs.), costly (up to $1700), provide limited gearing, and cannot shift under power.

The present invention therefore proposes a novel system and method of use for a gearing system which addresses these issues.

BRIEF SUMMARY OF THE INVENTION

The present invention, therefore, provides a system and method of use for changing gears.

Certain embodiments described herein include gear shifting systems that eliminate the need for a derailleur by using a belt or chain driven system and integrate existing controls. The gear shifting system described herein provides a lightweight, reliable, cost effective system that integrates with currently used components.

Embodiments include a system and device that uses two or more tooth or peg plates that can hinge in and out of engagement with a belt or chain drive. Two or more tooth plates are situated at set distance or radius from the center of a sprocket and define a particular diameter for that set of tooth plates. A second set of tooth plates can be positioned so that they have a diameter that differs from the first set of tooth plates, thus providing different gear ratios based on the difference in diameter. These tooth plates can be pushed into engagement by a shifter that slides along the x axis and engages a tooth plate. A locking bar is used to keep the tooth plate engaged and to disengage a tooth plate that is no longer being used.

Certain embodiments are directed to a rear sprocket assembly comprising: (a) a first sprocket having an inner and an outer face and an opening for attachment to a wheel hub; (b) a second sprocket having an inner and outer face and an opening for attachment to a wheel hub; (c) at least a first set of tooth plates having a base, a locking bar tab, and pins, wherein the pins are positioned perpendicular to the base; (d) a locking bar comprising a locking bar stop configured to interact with the locking bar tab of the tooth plate; wherein (i) the first and second sprocket are positioned parallel with the inner faces of the first and second sprocket facing each other forming a groove between inner faces of the first and second sprockets; (ii) the second sprocket is operatively coupled to two or more tooth plates, wherein the tooth plates can be positioned in an engaged position wherein the pins traverse the groove formed between the sprockets by being positioned through openings in the first and second sprockets and a disengaged position wherein the pins are substantially positioned on the outer face of the second sprocket, the tooth plates being moveable connected to the second sprocket by a hinge. In certain aspects a first set of tooth plates are positioned at first distance from the short axis of the first and second sprocket. In certain aspects, the assembly further comprises a second set of tooth plates positioned at a second distance from the short axis of the first and second sprockets. In still a further aspect the assembly further comprises a fixed gear positioned proximal to the short axis of the sprockets along the radius to the first and/or second tooth plates.

Certain embodiment are directed to a gear shifting system comprising: (a) the rear sprocket assembly described above operatively coupled to a cover assembly comprising (i) a removable cover that houses the rear sprocket assembly and is configured to allow a chain or belt to be operatively coupled to the rear sprocket assembly; (ii) a tensioner configured to maintain tension on a chain or belt engaging the rear sprocket assembly, and (iii) a shifter configured to engage and disengage one or more tooth plates of the rear sprocket assembly.

Certain embodiments are directed to a bicycle comprising a sprocket assembly and/or a gear shifting system as described above.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any system of device of the invention, and vice versa.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE SEVERAL VIEWS OF THE DRAWINGS

For a more complete understanding of the features and advantages of the present invention, reference is now made to the detailed description of the invention along with the accompanying figures in which.

DETAILED DESCRIPTION OF THE INVENTION

Disclosed herein is an improved system and method of use for gears. The numerous innovative teachings of the present invention will be described with particular reference to several embodiments (by way of example, and not of limitation).

In brief, as described herein provides for an effective and efficient system for changing gears.

Embodiments of the shifting system described can be applied to various types of bikes, e.g., exercise bikes, road bikes, or mountain bikes, or other vehicles, e.g., scooters and the like. In certain aspects, the gear shifting system can replaces derailluers that break easily, constantly have to be adjusted, and are expensive. Embodiments include a gear shifting system that eliminates a derailleur by using a belt or chain driven system and integrates existing controls on the bike. The gear shifting system described herein provides a light weight, reliable, cost effective system that integrates with currently used components.

Figure 1:
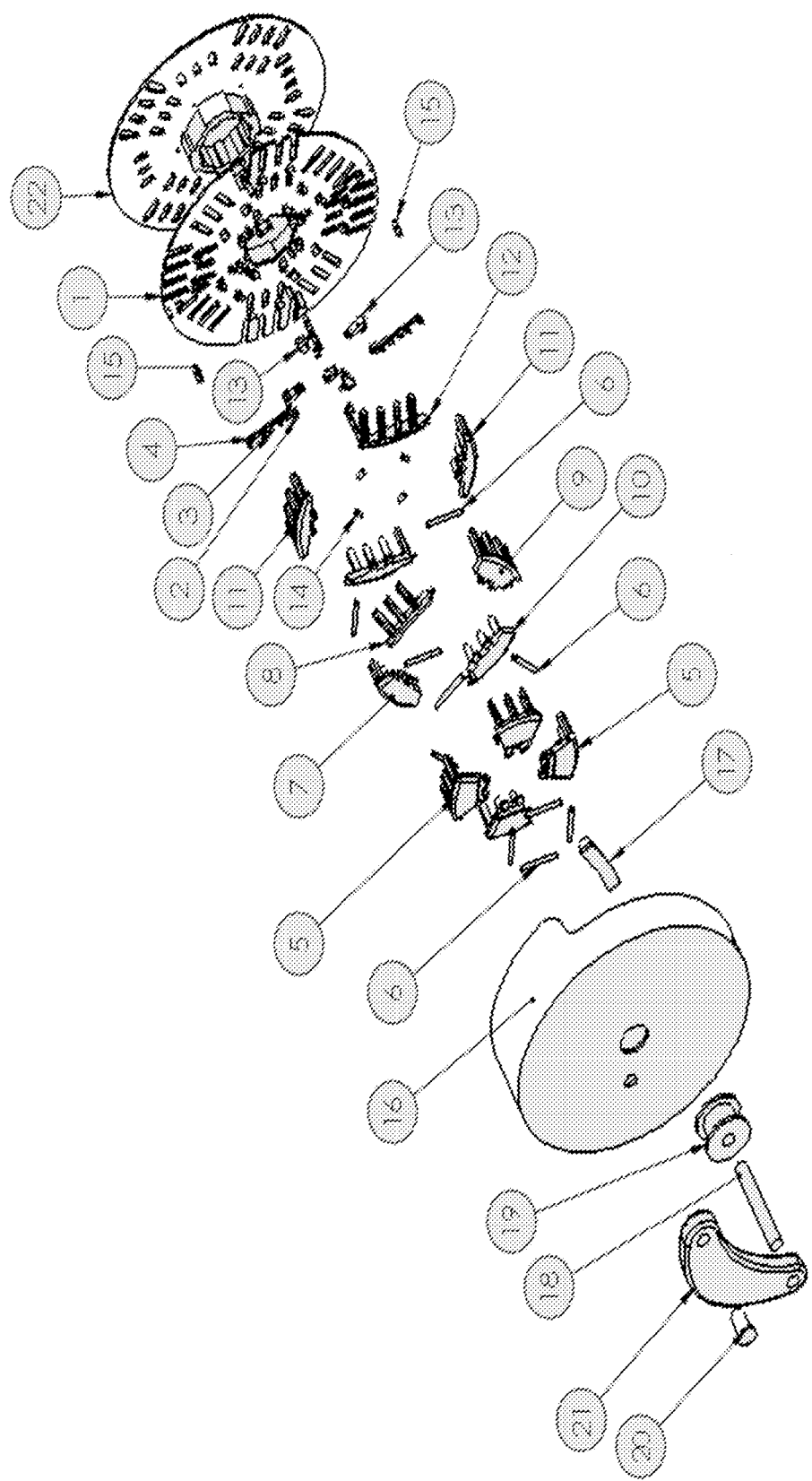
FIG. 1. Illustrates an exploded view of the gear shifting system.

The gear shifting is illustrated in an exploded view in FIG. 1 and comprises primarily two assemblies, a cover assembly and a sprocket assembly.

Figure 4:
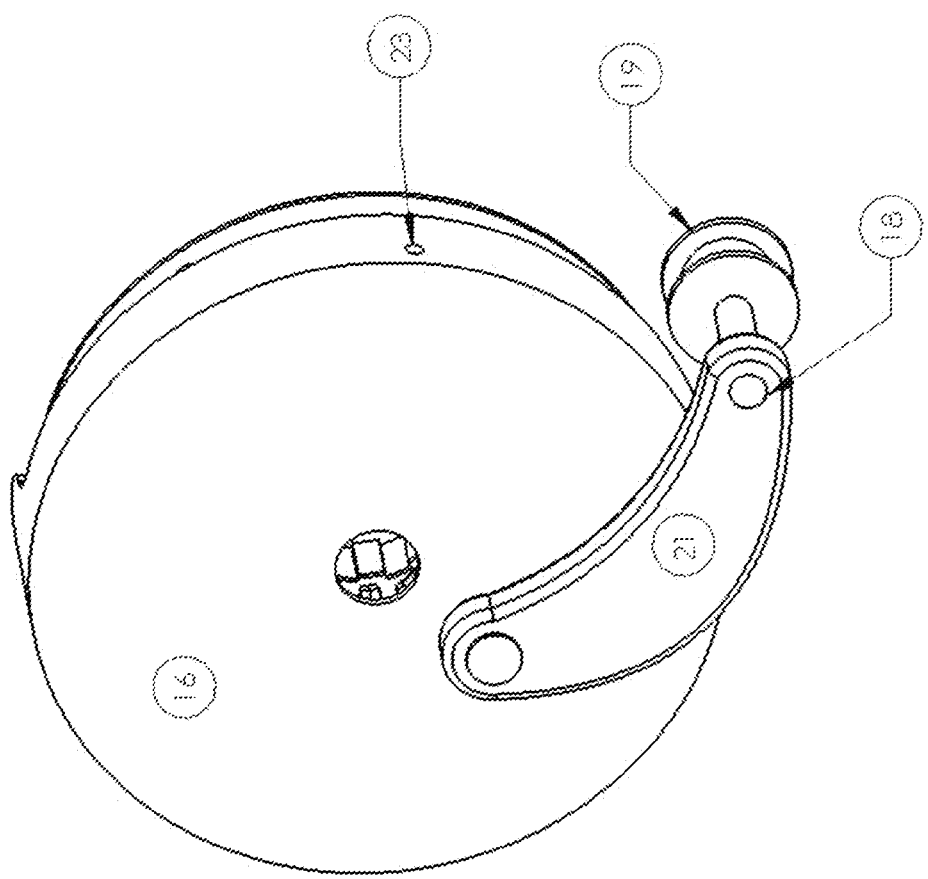
FIG. 4. Illustrates an external view of the gear shifting system depicting the cover assembly.
Figure 26:
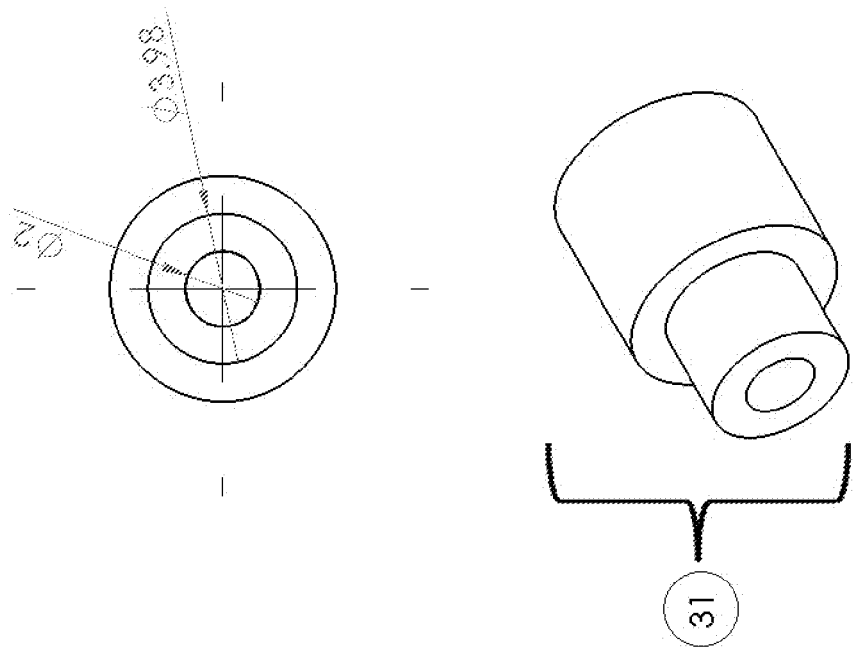
FIG. 26. Illustrates one design for the cable end component.
Figure 26:
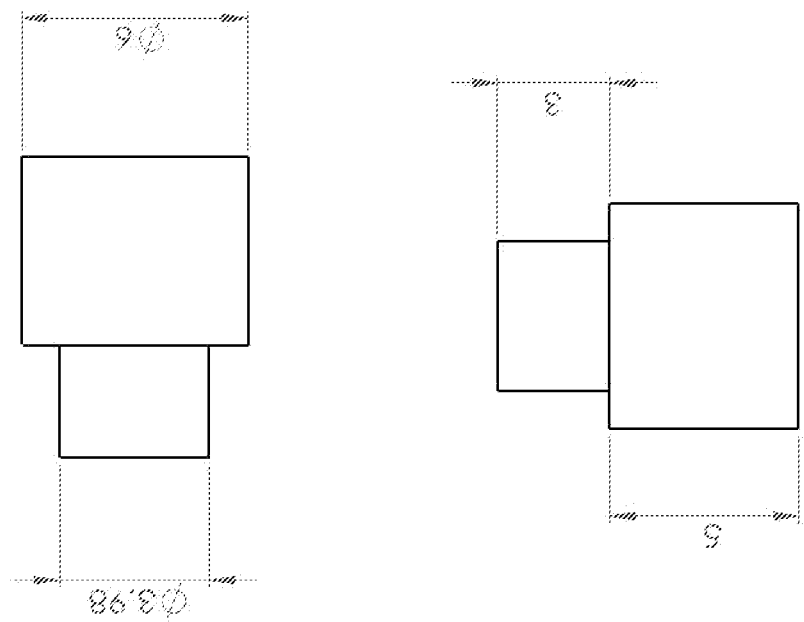
Figure 27:
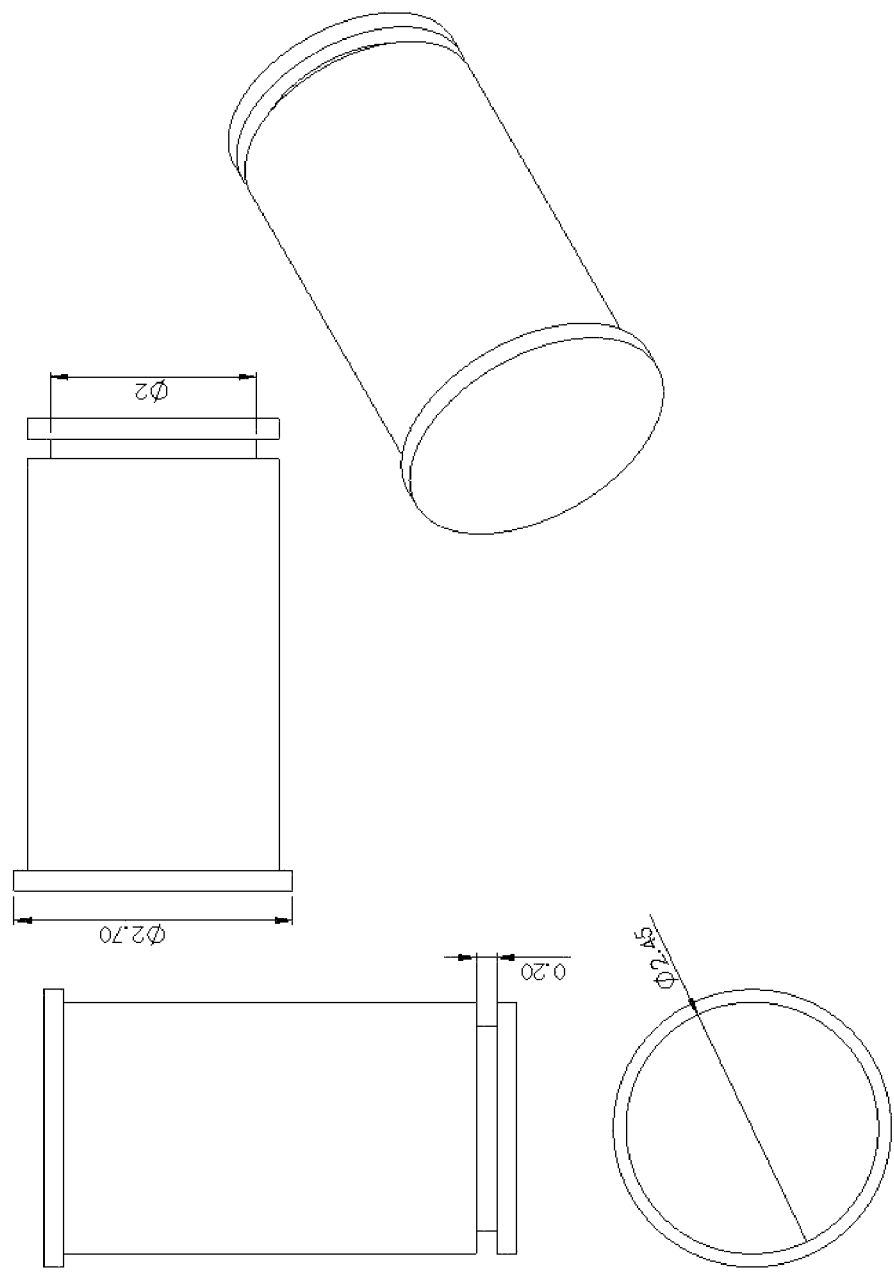
FIG. 27. Illustrates one design for the dummy plate rod component.
Figure 29:
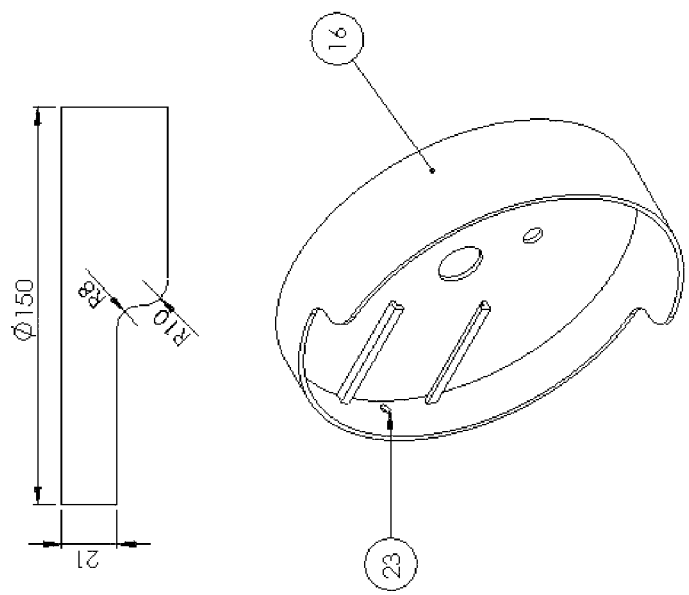
FIG. 29. Illustrates one design for the cover component.
Figure 29:
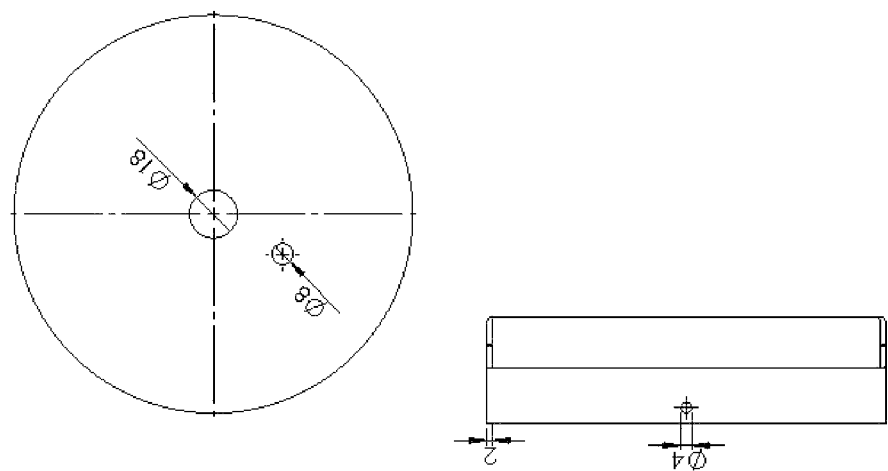
Figure 30:
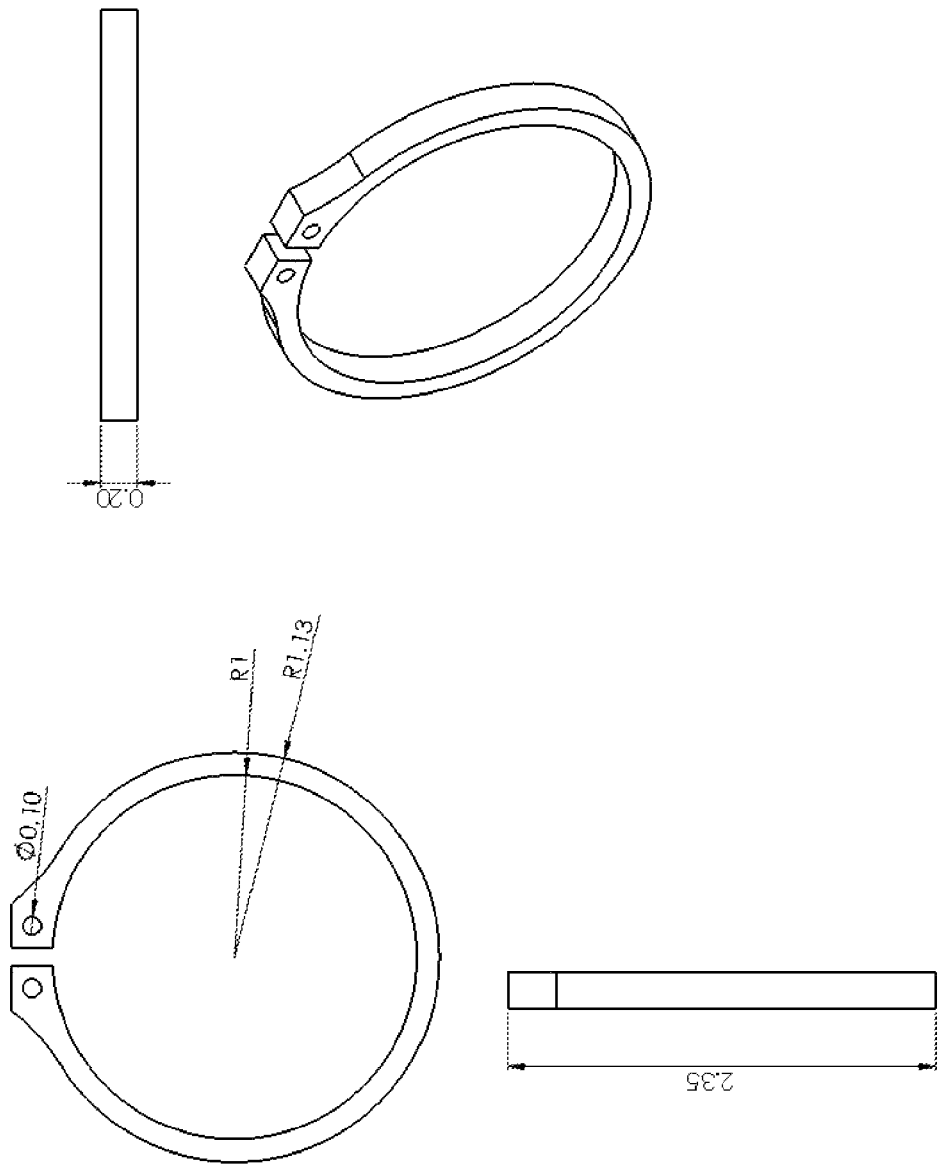
FIG. 30. Illustrates one design for the clip component.
Figure 31:
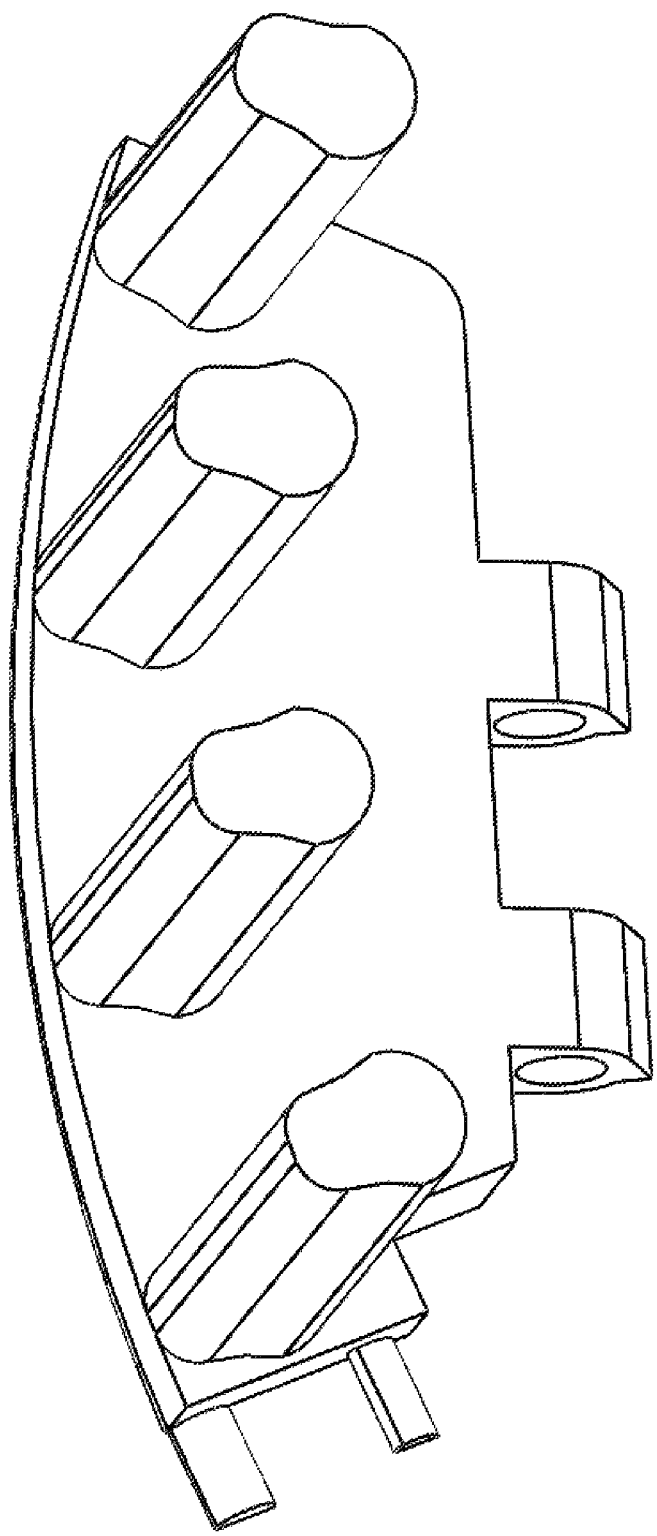
FIG. 31. Illustrates one design of the gear plate for a belt.
Figure 32:
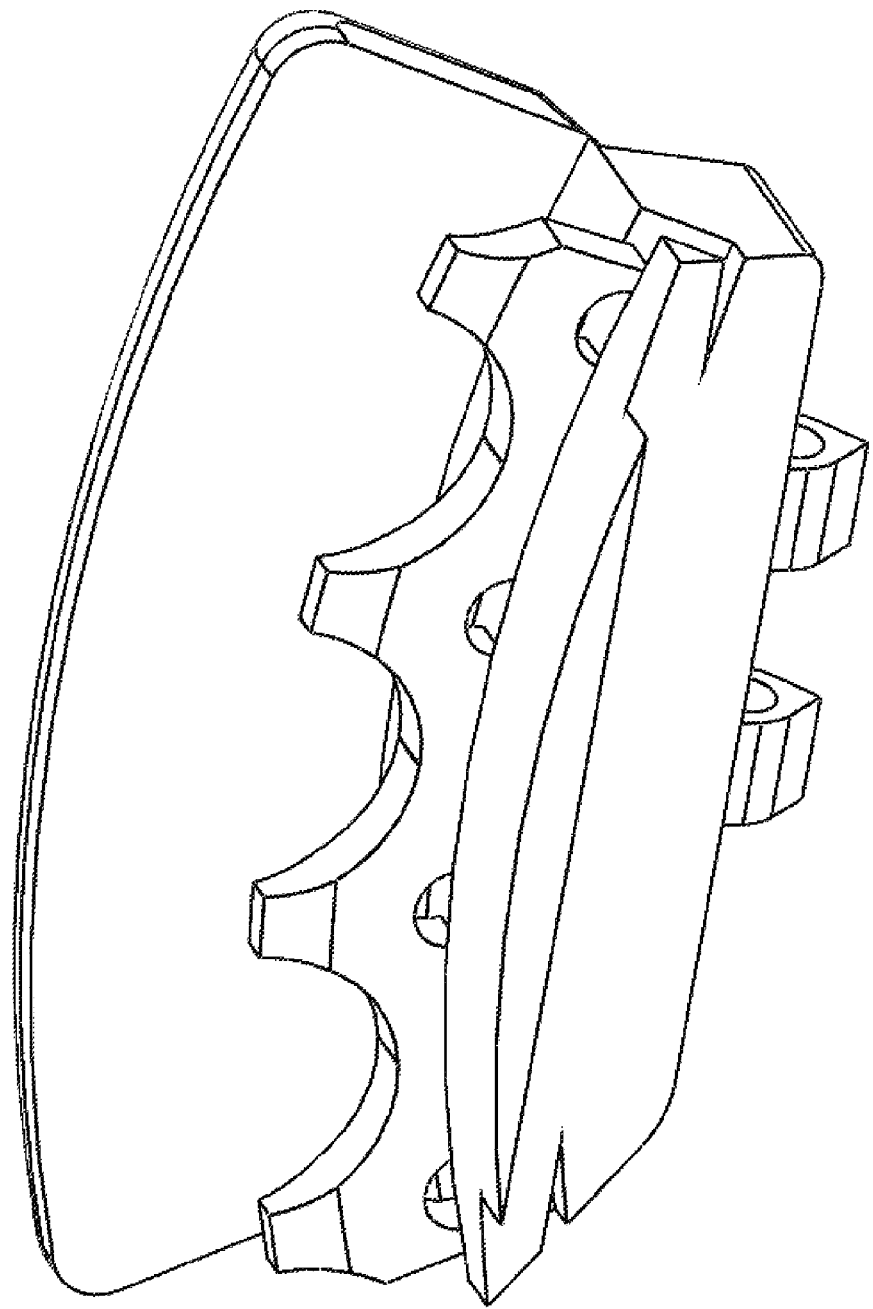
FIG. 32. Illustrates one design of the gear plate for a chain.
Figure 33:
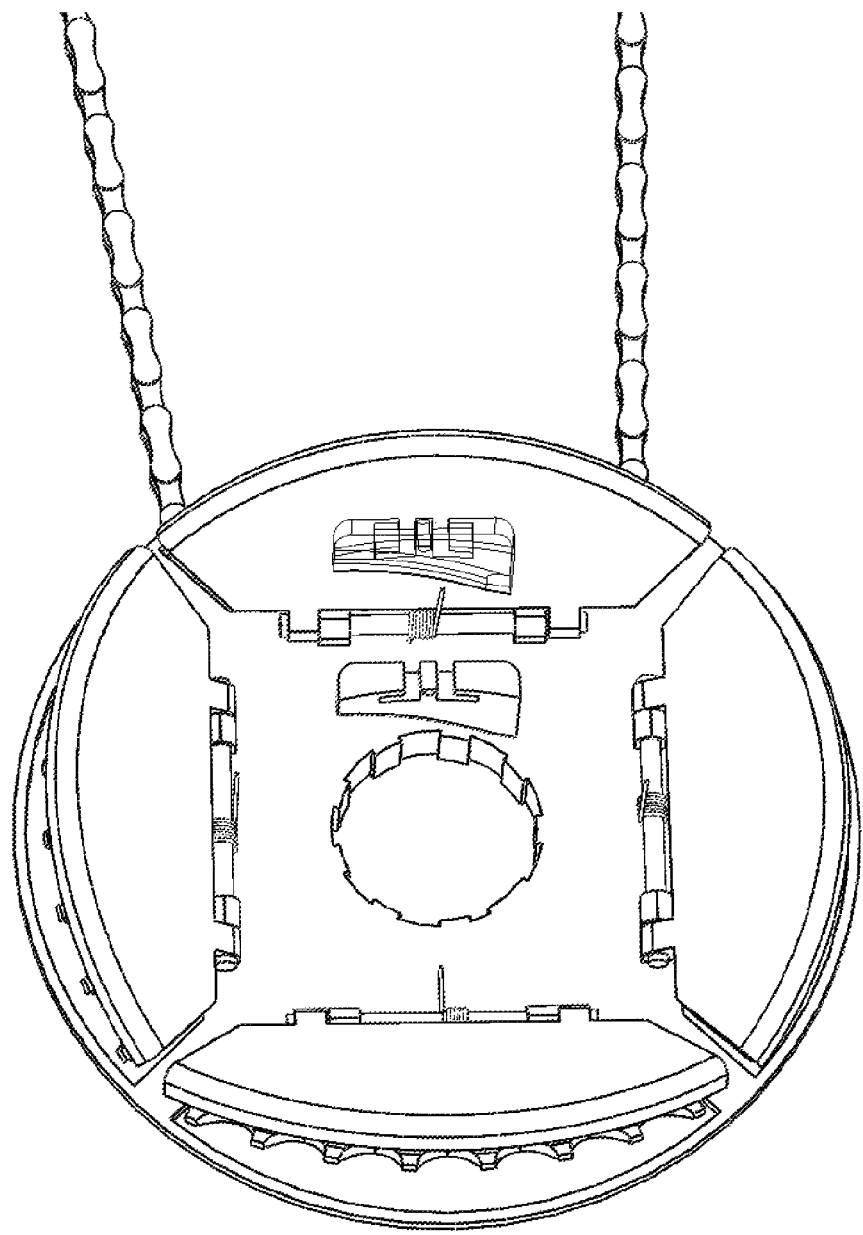
FIG. 33. Illustrates the gear system in a high gear plate shifter position in accordance with embodiments of the disclosure.
Figure 34:
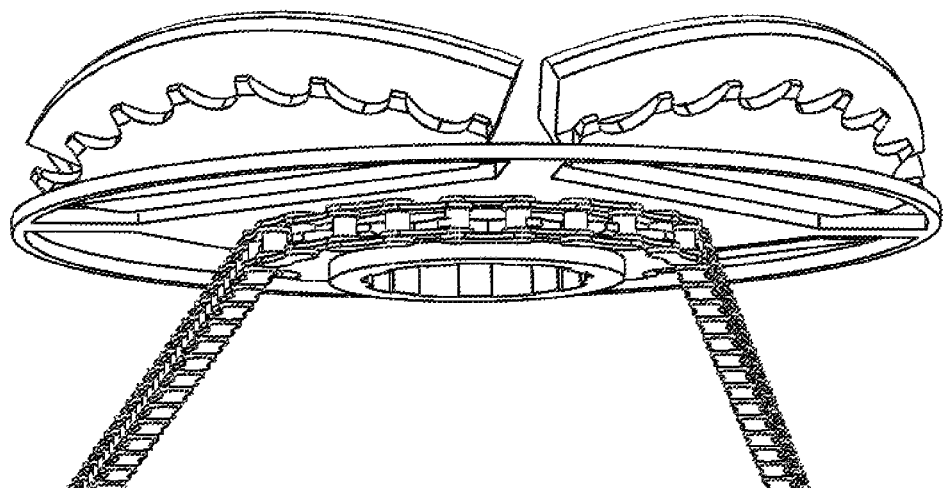
FIG. 34. Illustrates the gear system in a high gear side view in accordance with embodiments of the disclosure.
Figure 35:
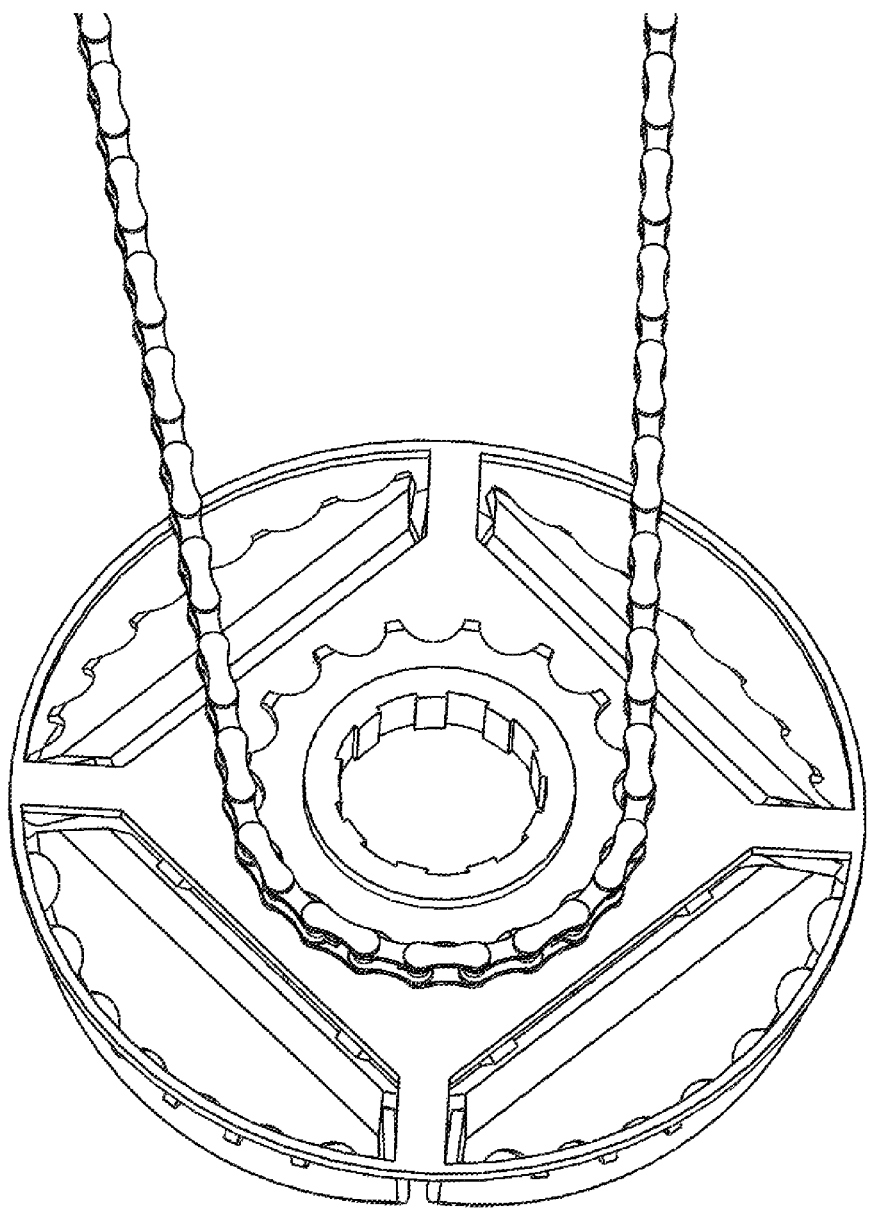
FIG. 35. Illustrates the gear system in high gear in accordance with embodiments of the disclosure.
Figure 36:
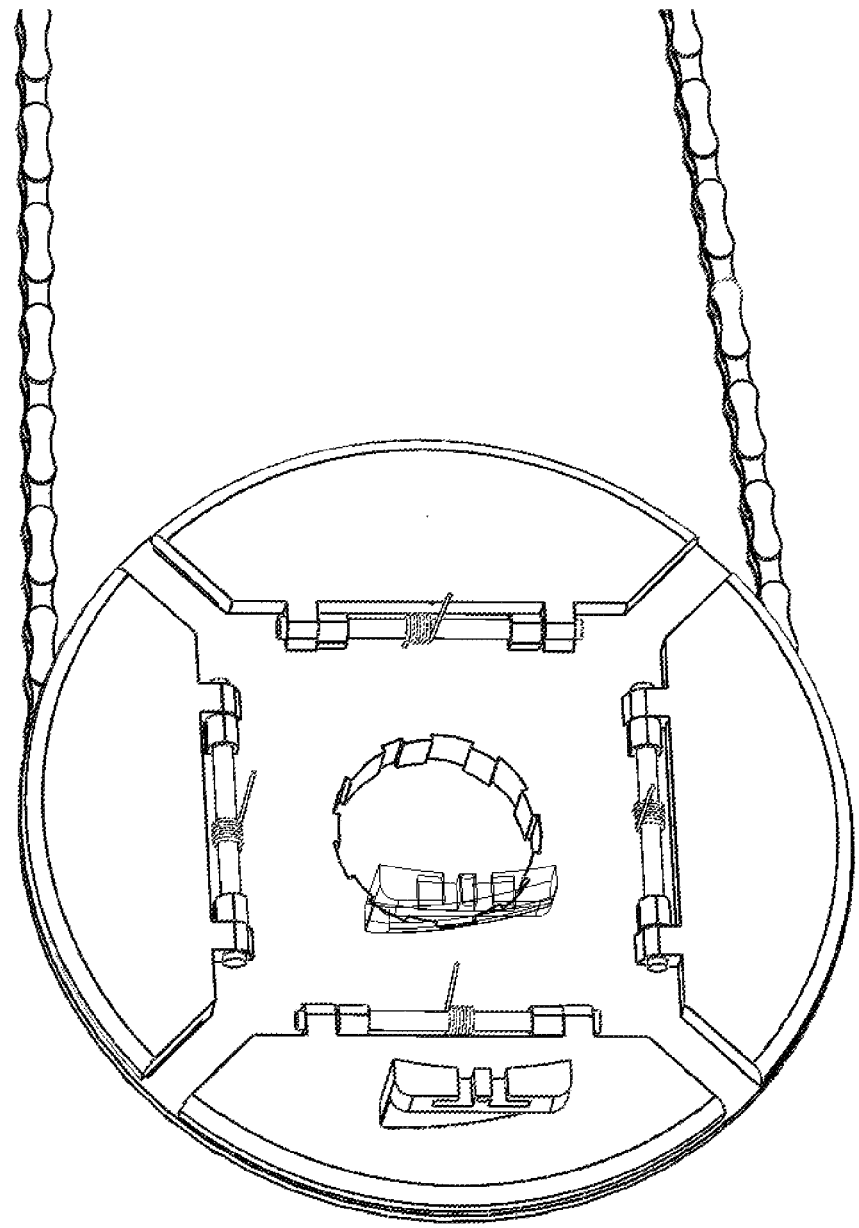
FIG. 36. Illustrates the gear system in low gear plate shifter position in accordance with embodiments of the disclosure.
Figure 37:
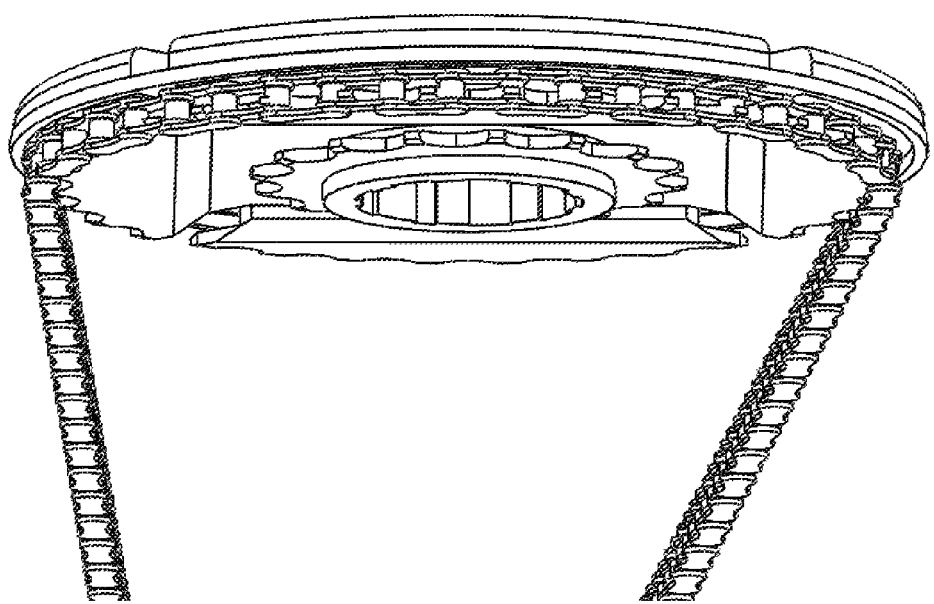
FIG. 37. Illustrates the gear system in low gear side view in accordance with embodiments of the disclosure.

The cover assembly comprises the cover 16, tensioner 21, and shifter 17. FIGS. 4 and 29 provide isolated views of the cover or the cover assembly. FIG. 4 illustrates a cover assembly including the tensioner 21 operatively coupled to the cover 16. Tensioner is also coupled to roller 19 using pin 18. FIG. 29 illustrates several alternative views of cover 16 and particularly illustrating cable port 23 that is configured for positioning a gear shift cable for the operation of the shifting mechanism. A gear shift cable is operatively coupled to the shifter and its associated components. FIG. 26 illustrates various perspectives of cable end 31 that is used to fix the cable to shifter 17.

Figure 2:
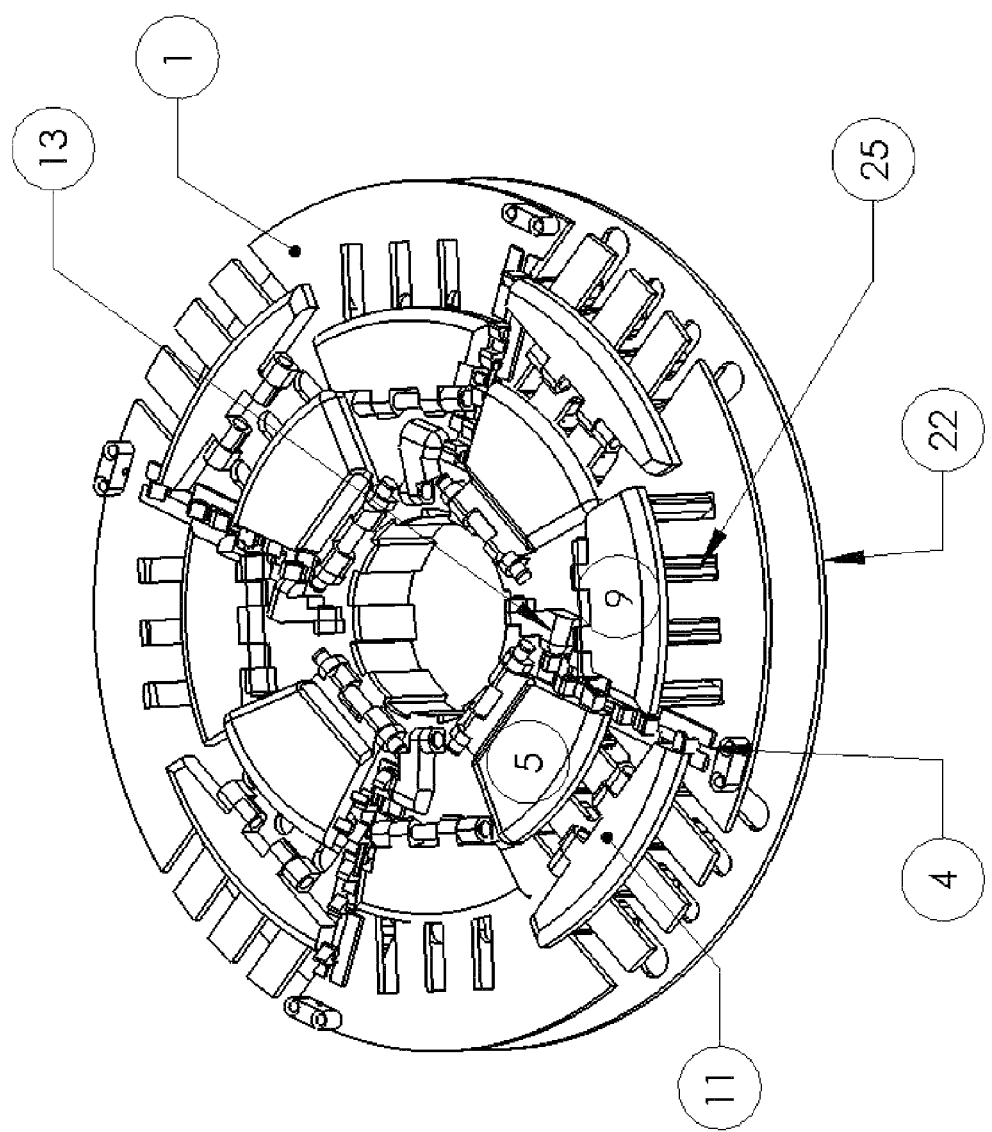
FIG. 2. Illustrates a second sprocket assembly having the sprocket and tooth plates assembled.

The sprocket assembly comprises one or more tooth plates, springs, locking bars, and sprocket faces. FIG. 1 also shows the rear sprocket assembly in an exploded depiction (items 1-15 and 22). FIGS. 2, 3, 9-13, 16-24, and 28 illustrate various components or assembly of the rear sprocket assembly. The rear sprocket assembly includes tooth plates such as 5, 9, and 11 (see FIGS. 17, 18, 19, 20, and 21 for various detailed views of tooth plate); fixed inner gear, locking bars (see FIGS. 22-24 for detailed illustrations of examples of locking bars), dummy plates, sprockets (including the first sprocket 22 and second sprocket 1), plate springs, and locking bar springs. Sprocket 1 provides mounting points for hardware and other parts or components. In certain aspects sprocket 1 has a mounting point for one or more other sprockets. In a further aspect sprocket 1 is configured to enhance stress distribution and provides for engagement of tooth plates 5, 9, or 11 with stress distribution and rigidity. The high gear or fixed gear is configured to reduce mechanical complexity and to provide increased strength. FIG. 2 shows an assembled rear sprocket assembly from the outer face of second sprocket 1. A first tooth plate 5, second tooth plate 9, and third tooth plate 11 are shown relative to locking bar 4. The locking bar tabs 27a and 27b of tooth plates 5, 9, and 11 are positioned on the side in common with the other tooth plates so as to interact with locking bar 4. In certain aspects where more than three sets tooth plates are present more than one locking bar 4 can be employed. As described in more detail below the shifter, as it moves across the tooth plates causes locking bar 4 to move in a ratcheting action that secures the newly engaged gear and releases the previously engaged gear by altering which locking bar tab, 27a or 27b is held by locking bar stop 28, see below. Tension is applied through the locking bar attenuator 13 and locking bar spring coupled thereto.

Figure 3:
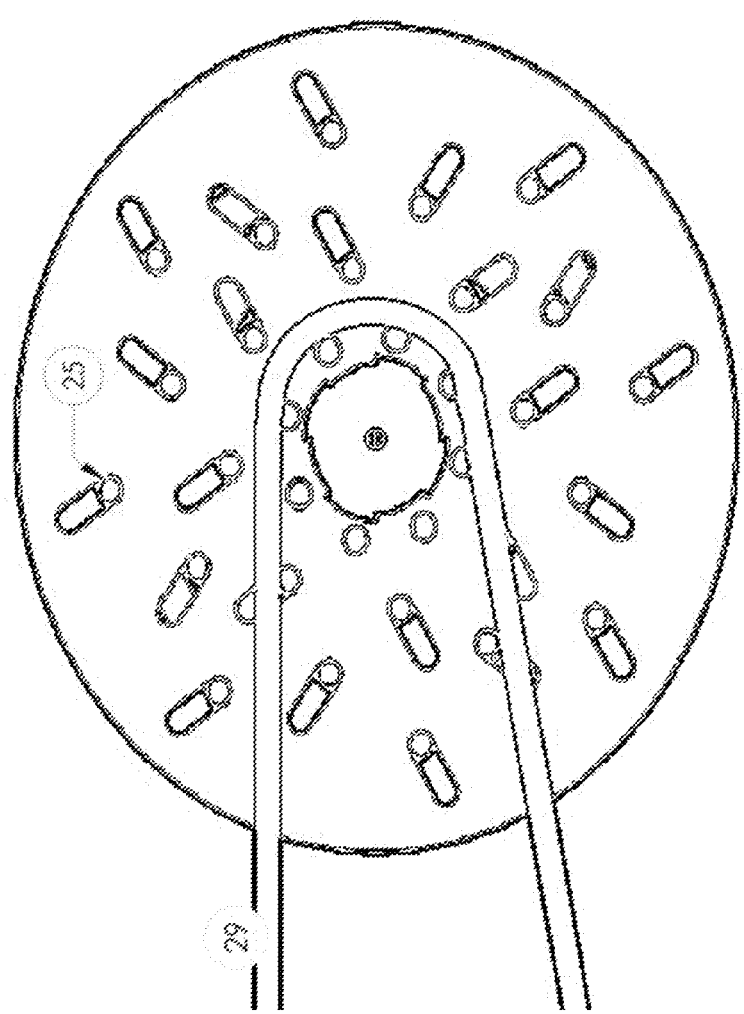
FIG. 3. Illustrates a cross sectional view perpendicular to the short axis of the gear assembly engaging a belt. The belt is shown engaged with the fix gear of the rear sprocket assembly.

FIG. 3 depicts a belt or chain 29 engaged with the inner most fixed gear represented by the inner most circularly arranged circles of FIG. 3. The pins 25 represented by the circles are engaged with belt or chain 29 and traverse the groove formed between the first sprocket 22 and the second sprocket 1. The other pins depicted are in an engagement position because of the configuration of locking bar tab 27a and/or 27b and the tension placed on the tooth plate by the tooth plate spring. The plate spring is configured to maintain tooth plate 5, 9, or 11 in a non-engaged configuration until shifter 17 so engages. Once engaged locking bar 4 comprising locking bar stops 28 hold the engaged tooth plate in a operative position until shifter 17 acts on an adjacent tooth plate. As the tooth plates are engaged the arc of the belt or chain will increase or decrease as gear having a different diameter is engaged.

Figure 17:
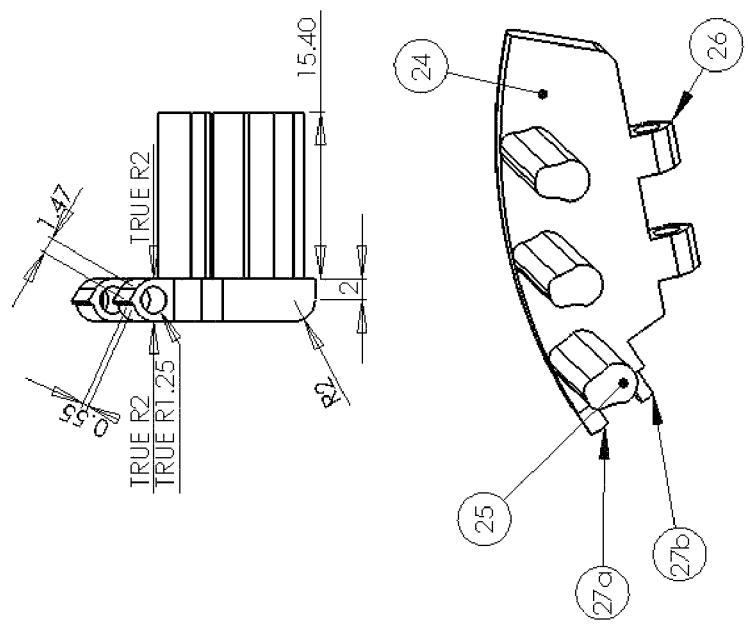
FIG. 17. Illustrates one design for the tooth plate.
Figure 17:
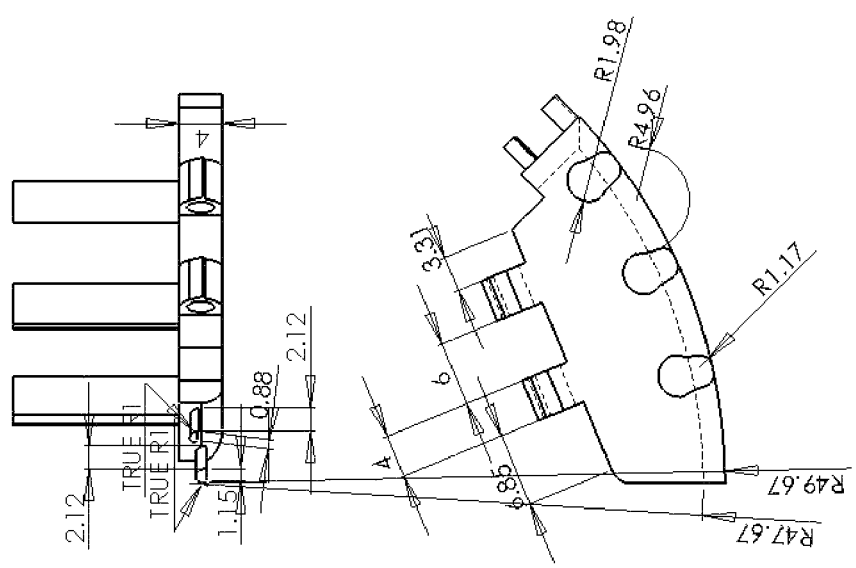
Figure 18:
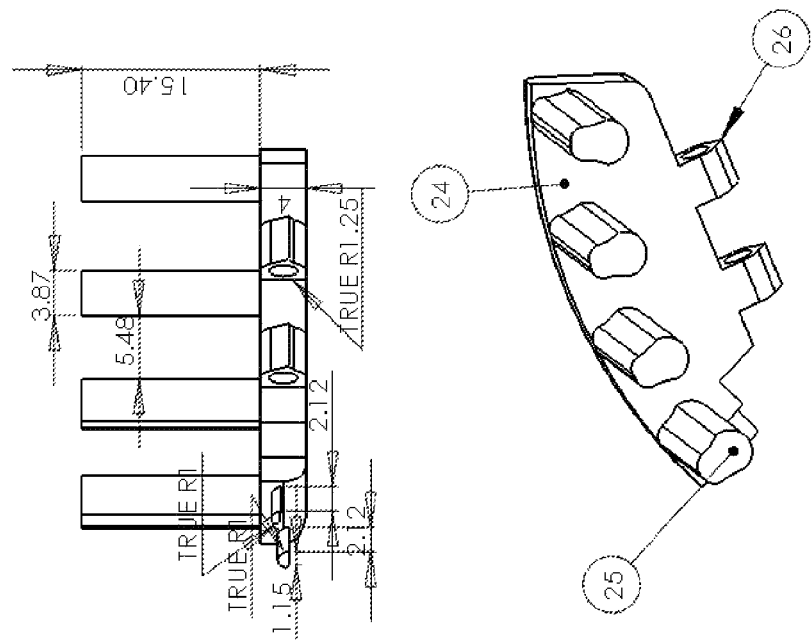
FIG. 18. Illustrates a second view of the tooth plate of FIG. 17.
Figure 18:
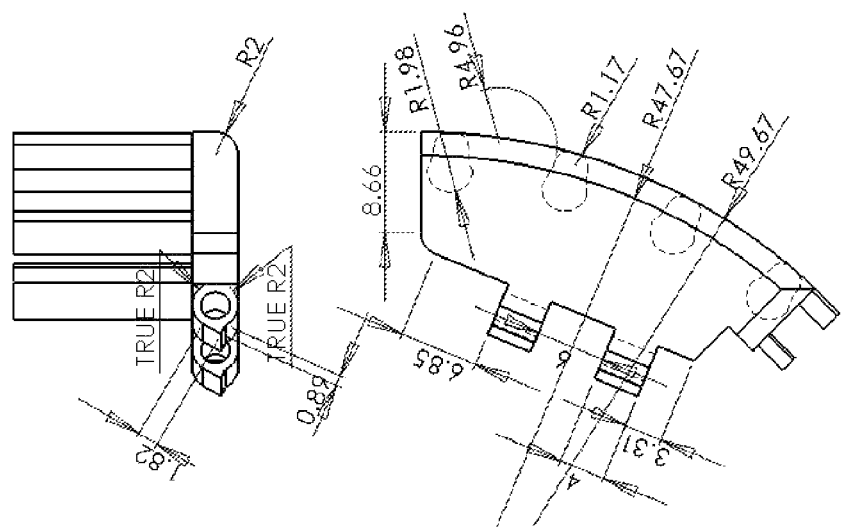
Figure 19:
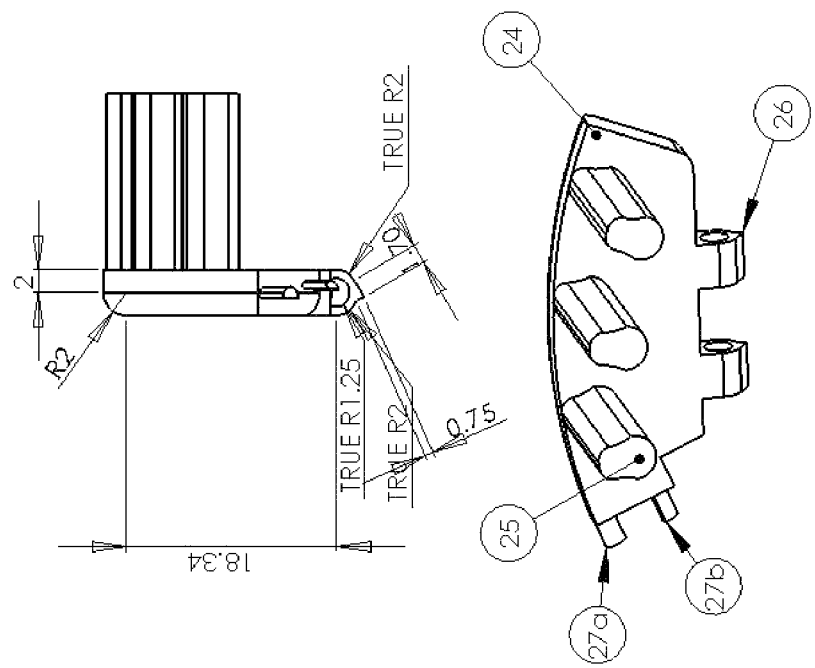
FIG. 19. Illustrates a third view of the tooth plate of FIG. 17.
Figure 19:
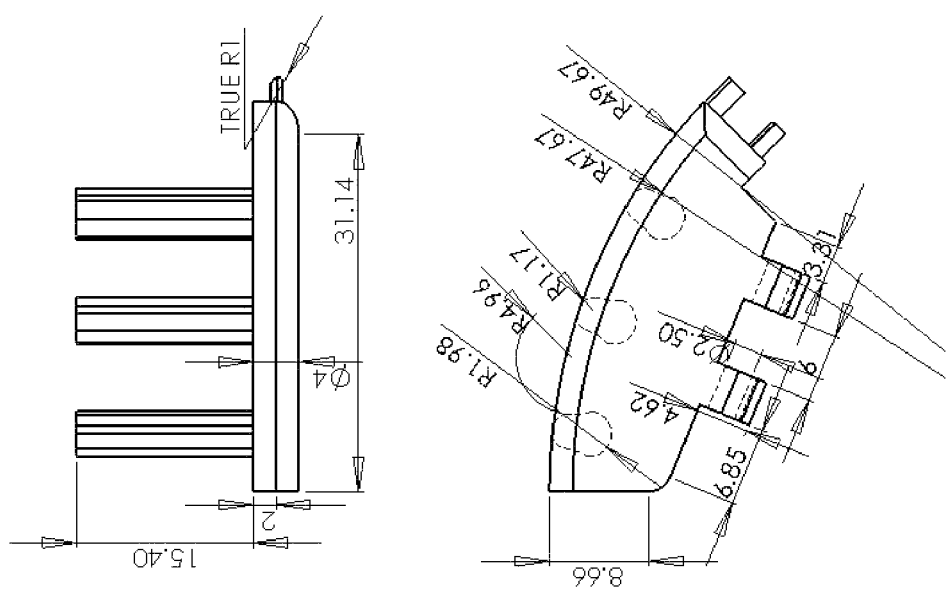
Figure 20:
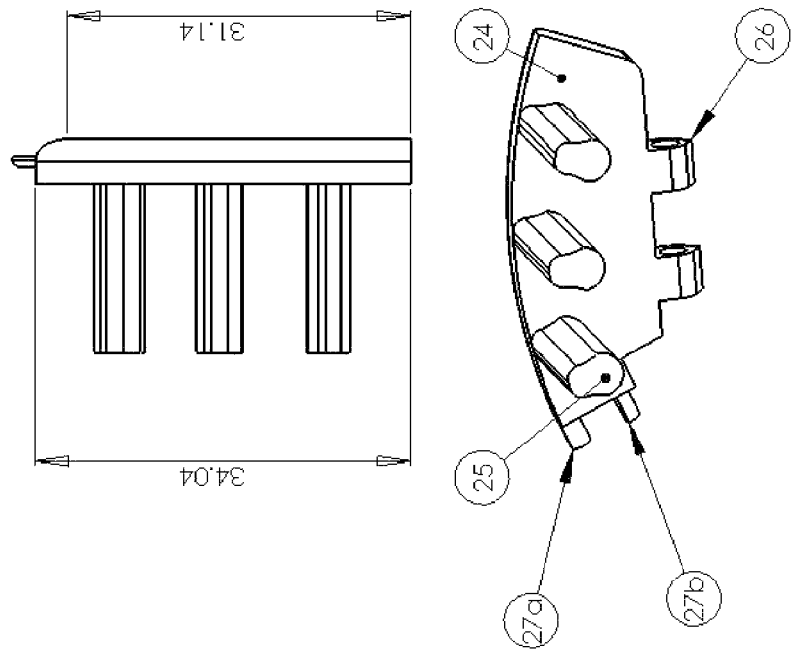
FIG. 20. Illustrates a fourth view of the tooth plate of FIG. 17.
Figure 20:
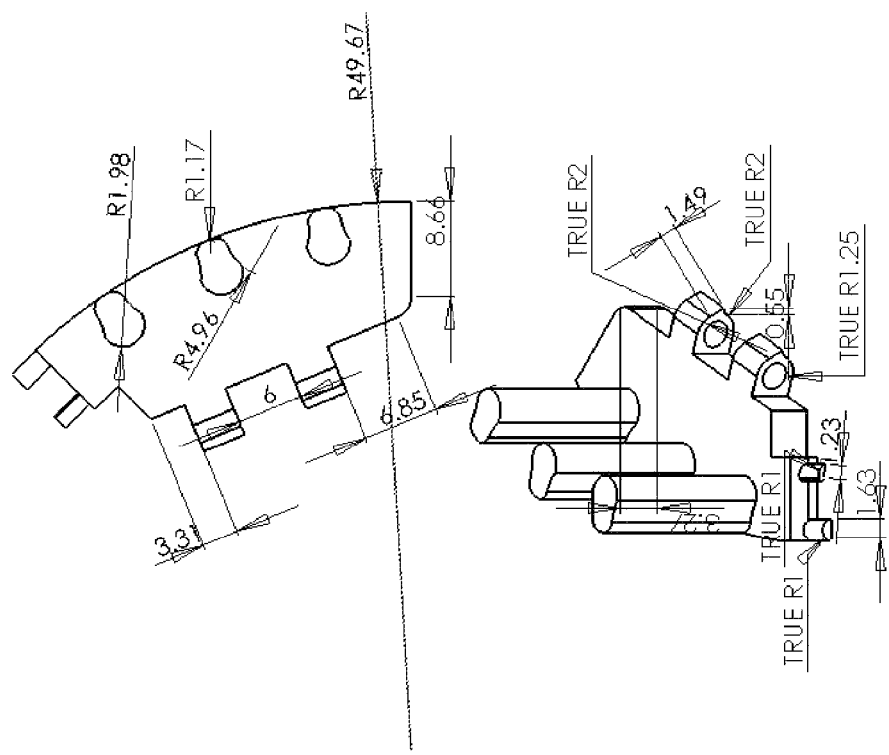
Figure 21:
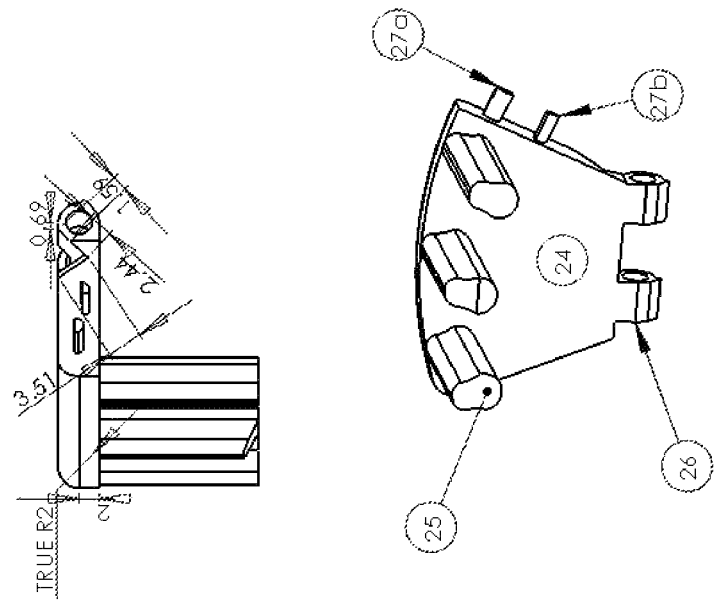
FIG. 21. Illustrates a fifth view of the tooth plate of FIG. 17.
Figure 21:
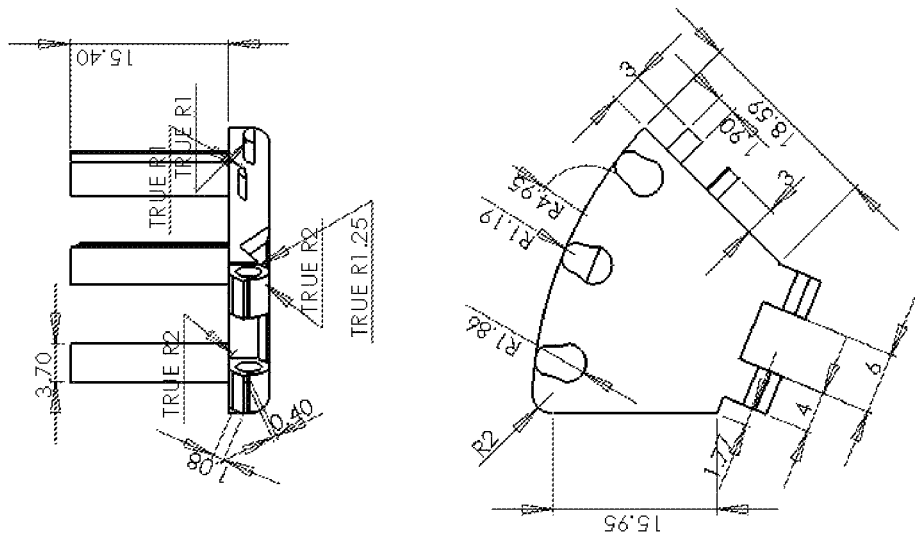
Figure 22:
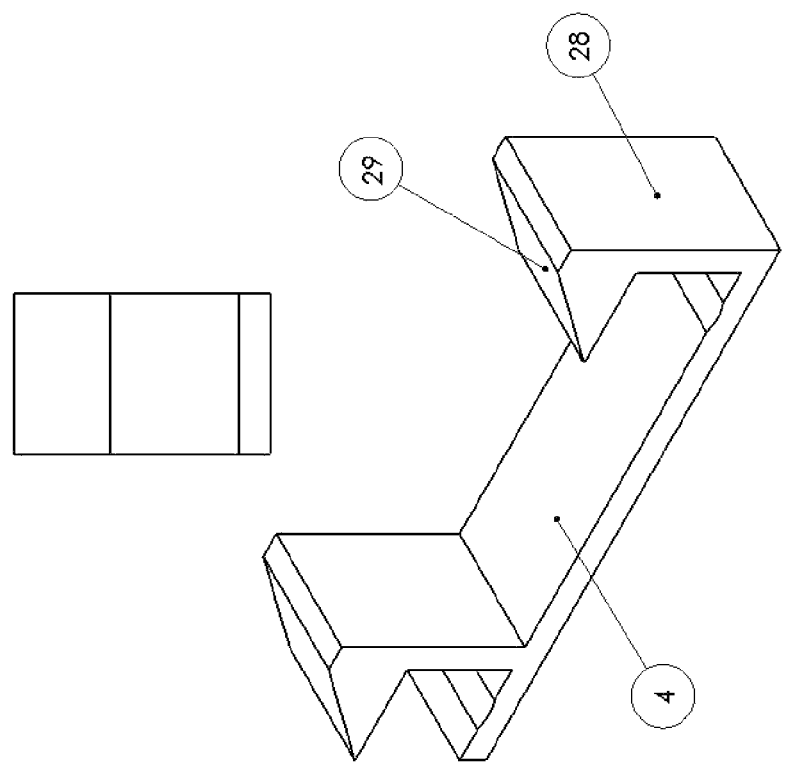
FIG. 22. Illustrates on design of the locking bar component.
Figure 22:
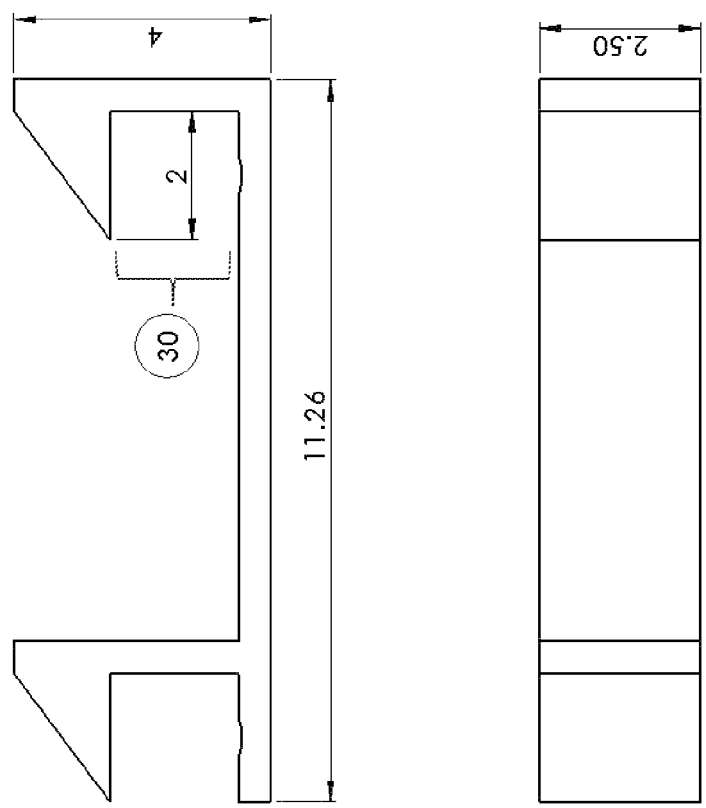
Figure 23:
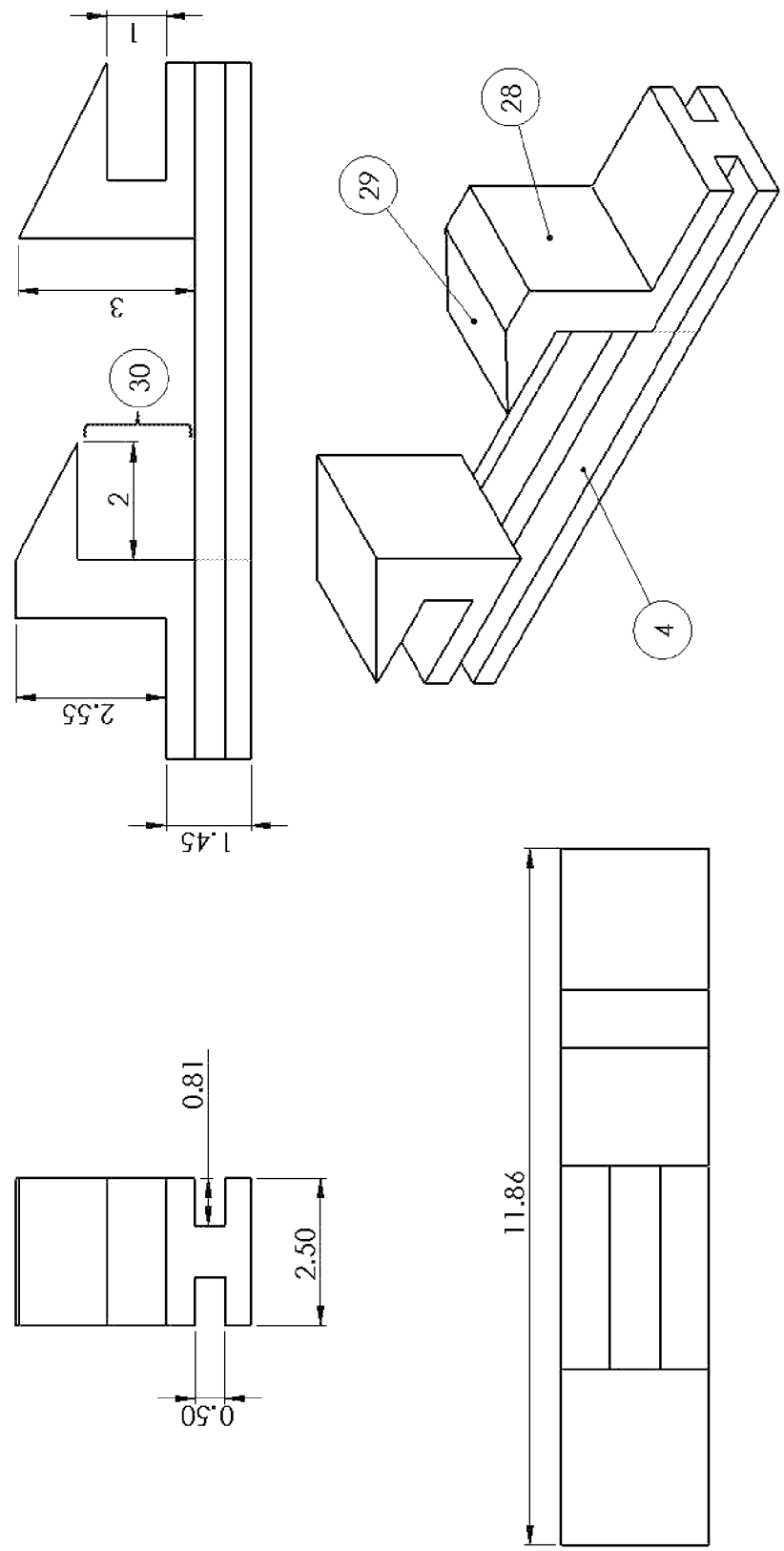
FIG. 23. Illustrates a second design of the locking bar component.
Figure 24:
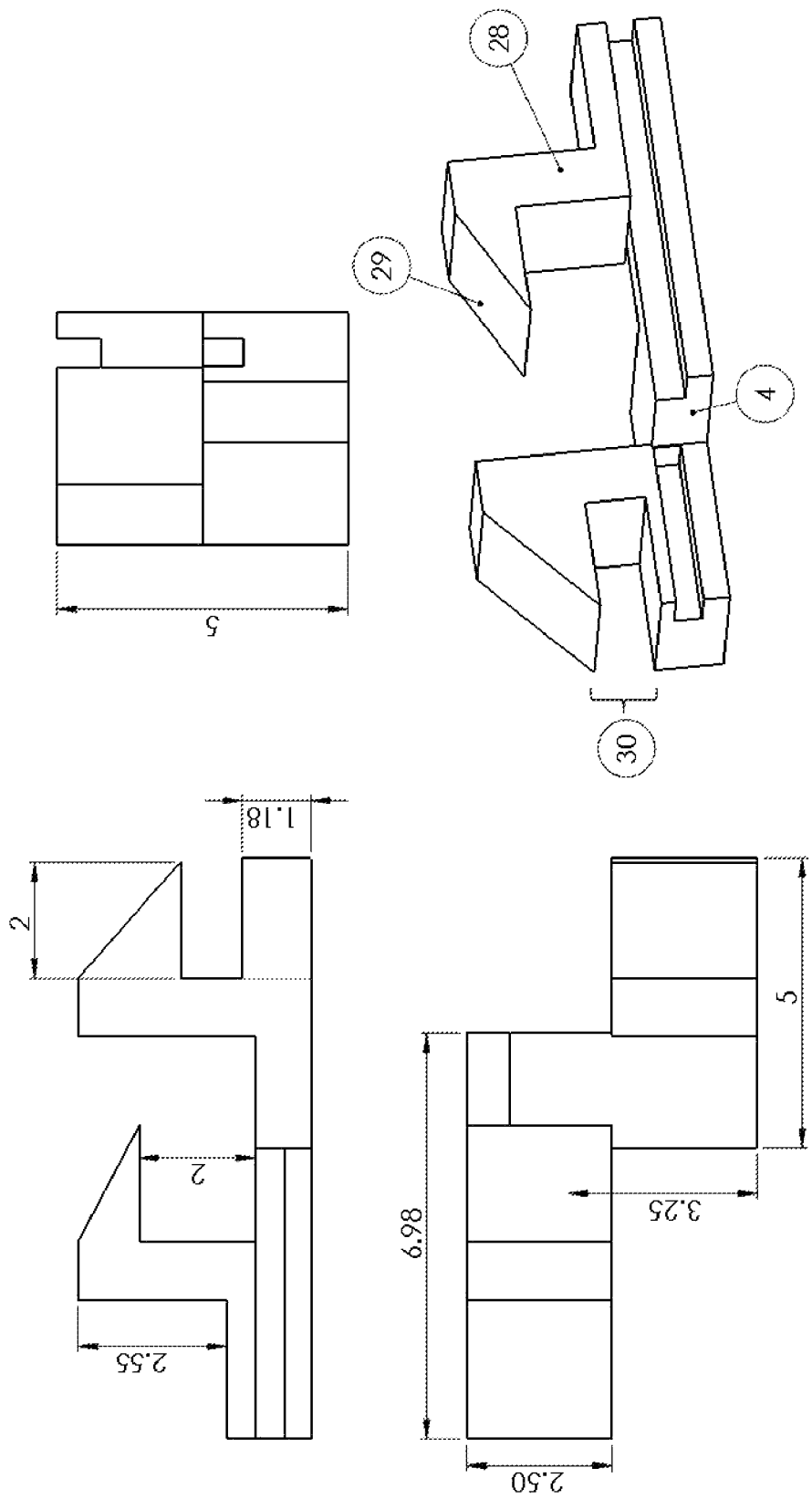
FIG. 24. Illustrates a third design of the locking bar component.
Figure 28:
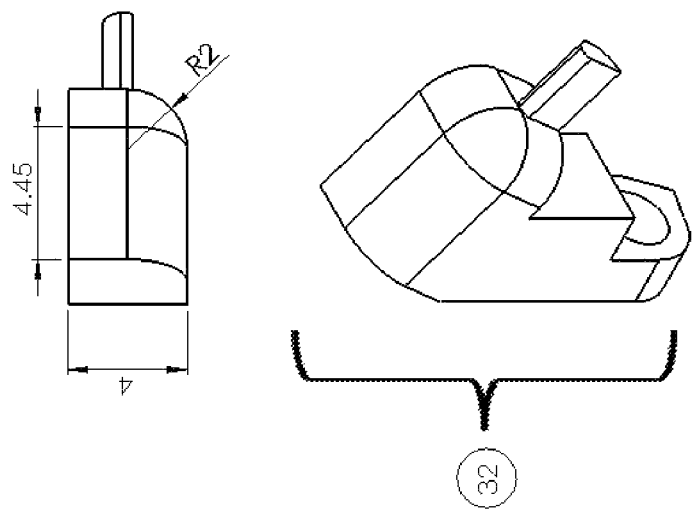
FIG. 28. Illustrates one design for the tooth plate locking bar tab component.
Figure 28:
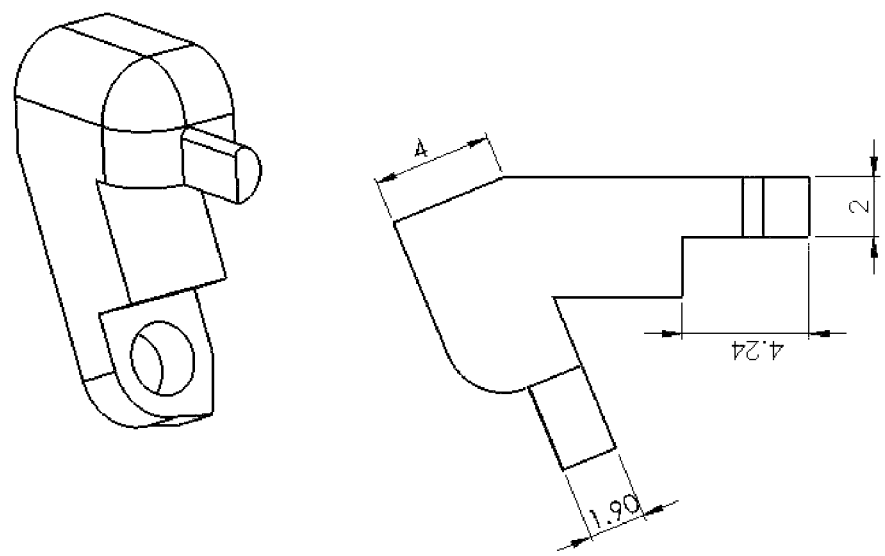

FIGS. 17, 18, 19, 20, and 21 illustrate various detailed views of tooth plate 5, 9, or 11. As shown in FIG. 17, for example, tooth plate comprises a base 24 having 1, 2, 3, 4, 5 pins 25 configured at an approximately 90 degree angle relative to plane of base 24. Base 24 is configured to form a tooth plate portion of a hinge 26, which when coupled with a second sprocket hinge portion, and provided rod 6 is inserted through the center of the hinge, form a functional hinge that allows the tooth plate base to be moved in a plane perpendicular to first sprocket 22 and second sprocket 1. Base 24 also comprises tooth plate tabs 27a and 27b, which are configured to interact with a locking bar 4 (FIGS. 22, 23, and 24). As shown in FIG. 22, for example, the locking bar comprises locking bar stops 28 having an angled overhang 29 forming a slot 30. Locking bar stop 28 is configured to maintain the position of the tooth plate by contacting tooth plate tab 27b. FIG. 28 illustrates various perspectives of an example of locking bar actuator 32, which is configured to maintain tension of the locking resulting in the ratcheting action when tooth plates are engaged by shifter 17.

Tooth plate tab 27 engages a locking bar stop as the shifter moves along a radial axis during shifting over the tooth plate. In certain aspects the tooth plate can be in one of three configurations during operation (i) unlocked or disengaged position where neither tooth plate tab 27 are positioned in a locking bar stop groove, (ii) partially engaged configuration consist of a tooth plate that has one tooth plate tab 27 positioned with in a locking bar stop groove, the tooth plate in this configuration is not actively engaged with a chain or belt, and (iii) engaged configuration where both tooth plate tab 27 are positioned in a locking stop groove, this configuration has the tooth 25 of the tooth plate actively engaged with the chain or belt driving movement of an attached wheel.

Figure 25:
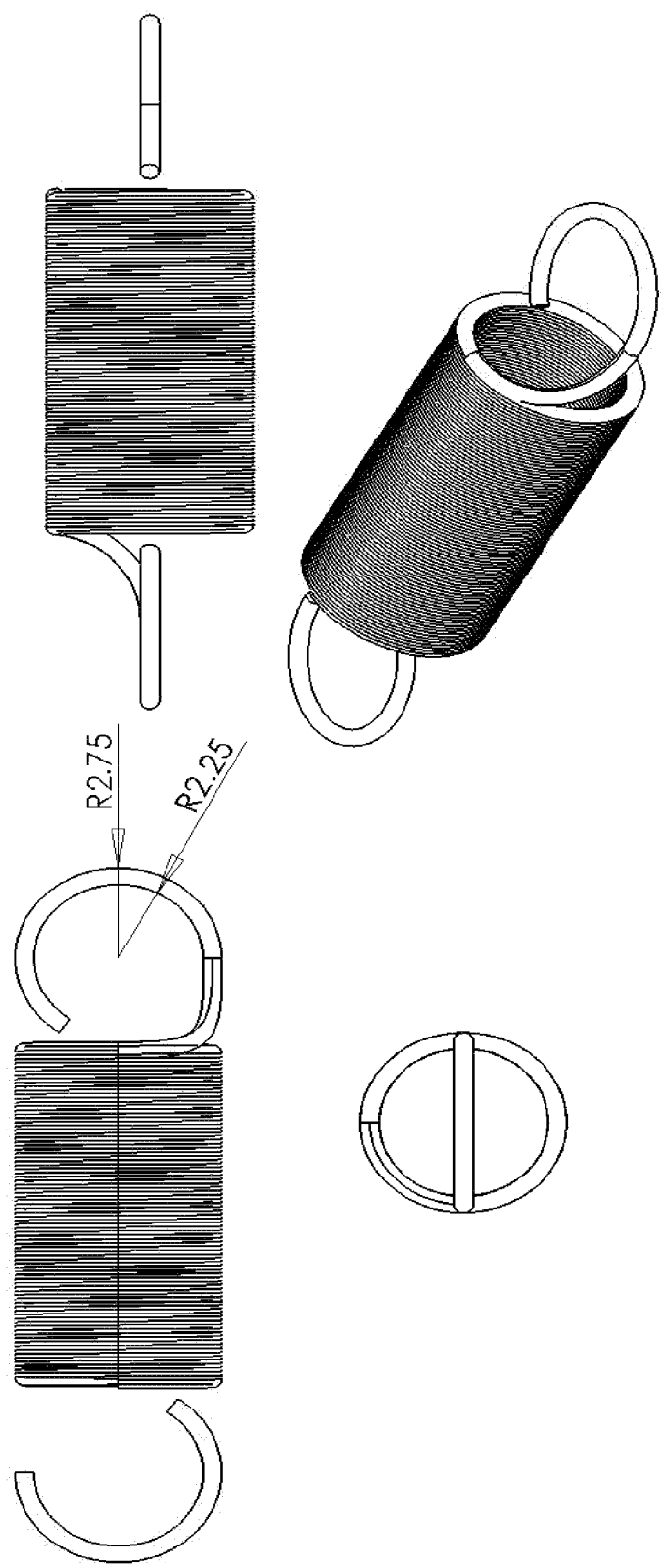
FIG. 25. Illustrates one design for the shifter spring mechanism.

As shifter 17 moves linearly from the fixed gear closest to the first sprocket a first tooth plate is moved from being antiparallel to the second sprocket to about parallel to the second sprocket, which moves the tooth associated with that tooth plate into an engaged position and positions both a first and second tooth plate tab 27 in a groove of the lock bar stop, engaging the gear associated with the first tooth plate. When the operator of the gear shift so desires the shifter can be moved to engage a second tooth plate (a second gear). FIG. 25 illustrates various perspectives of shifter spring, which provides tension to shifter 17.

Figure 5:
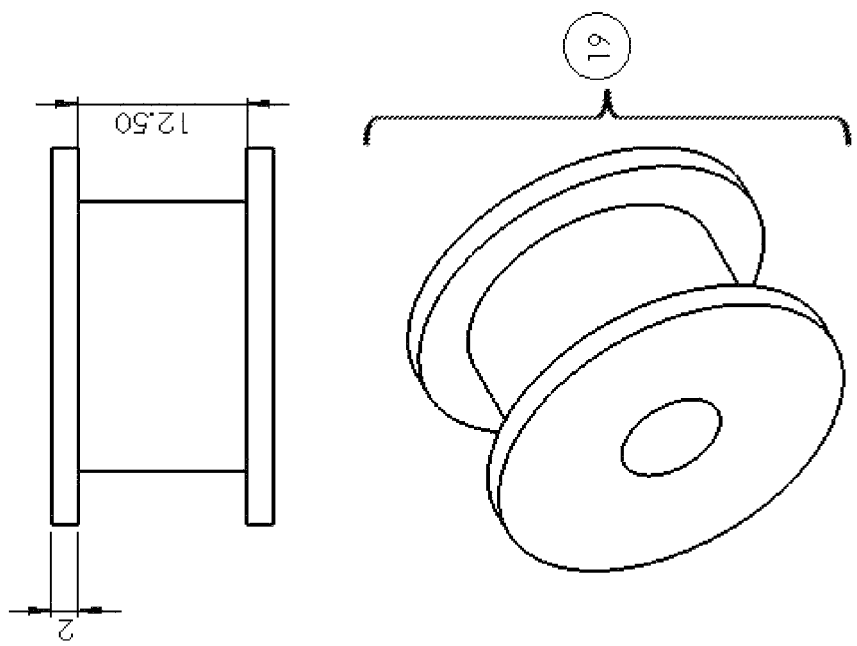
FIG. 5. Illustrate one design for the roller component.
Figure 5:
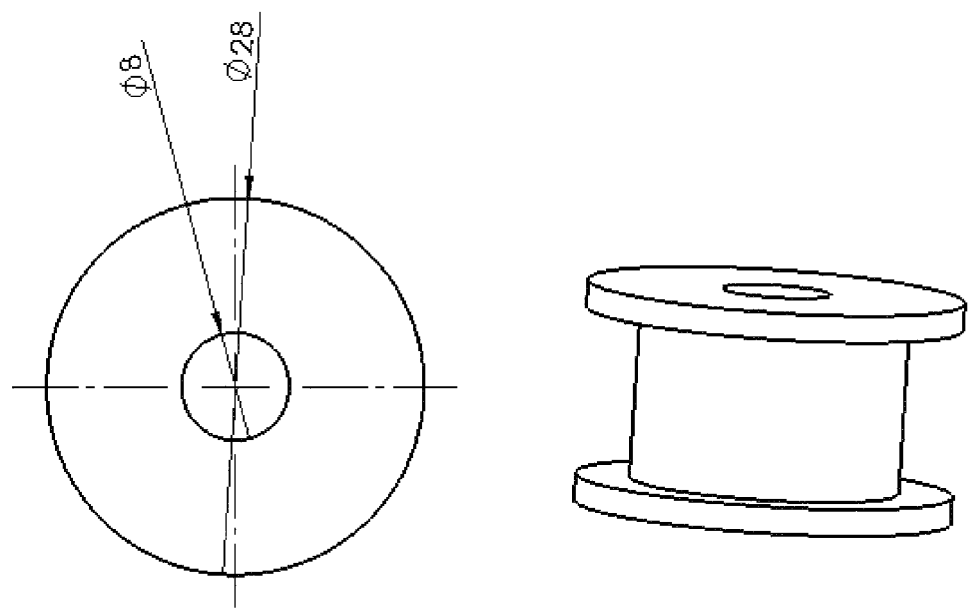
Figure 6:
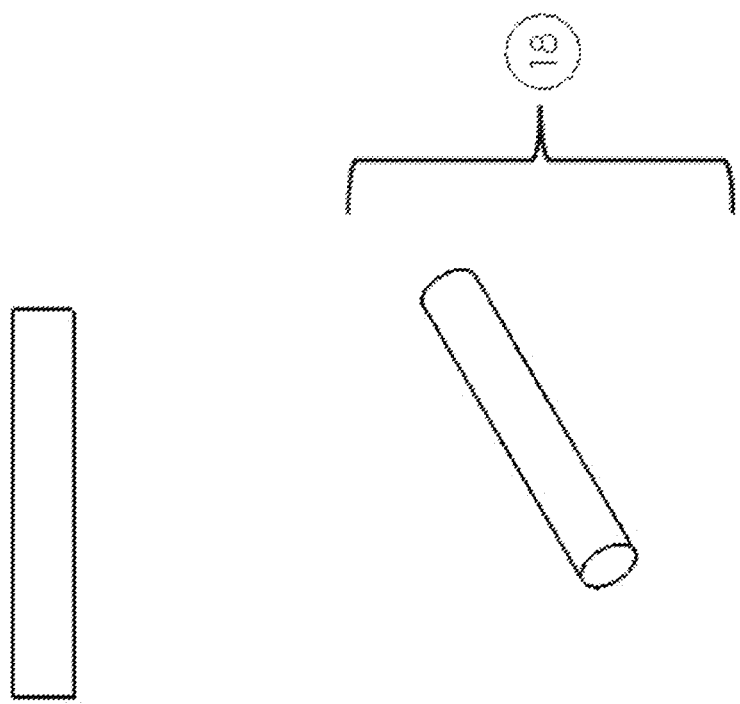
FIG. 6. Illustrates one design for the pin component.
Figure 6:
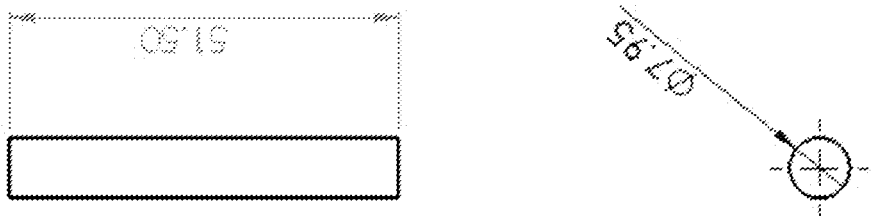
Figure 7:
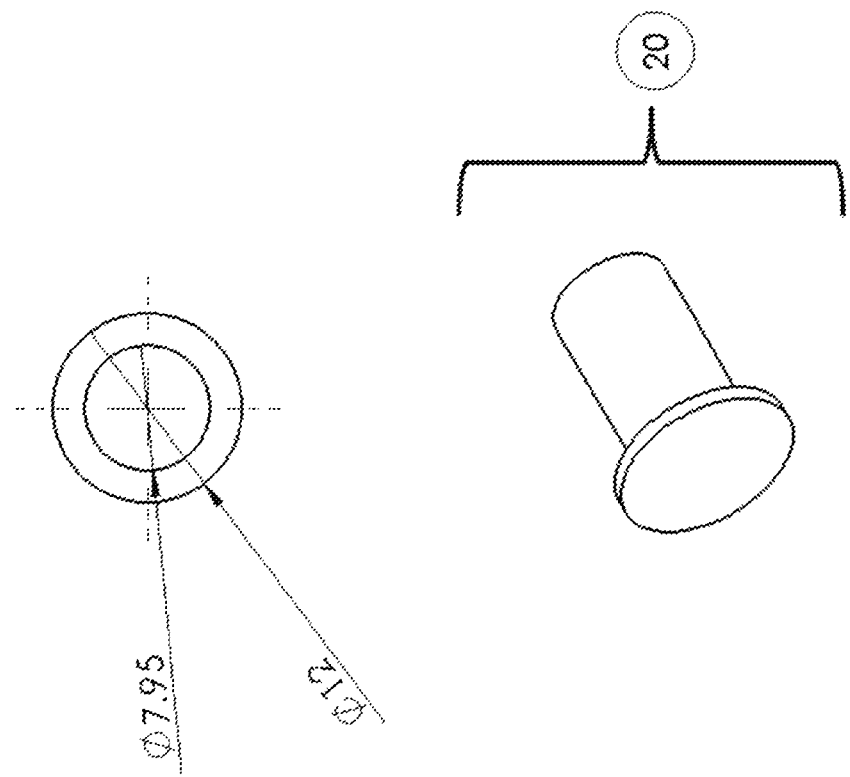
FIG. 7. Illustrates one design for the bolt component.
Figure 7:
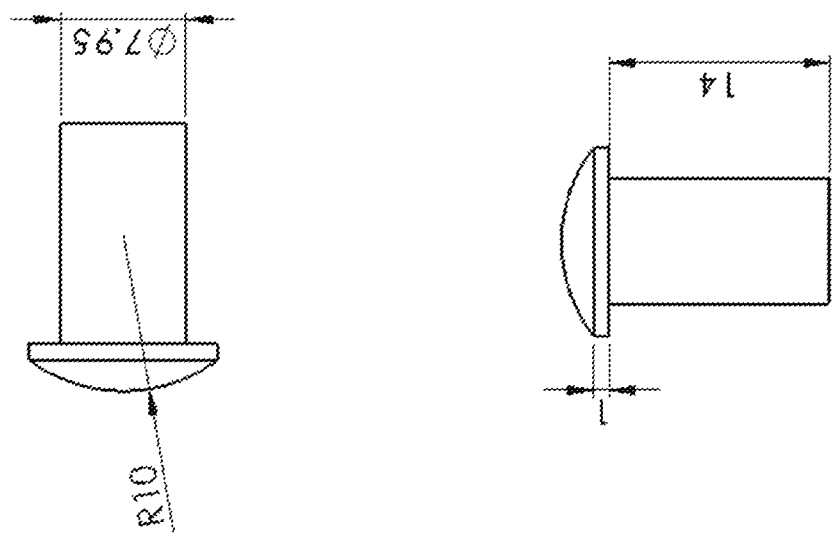
Figure 8:
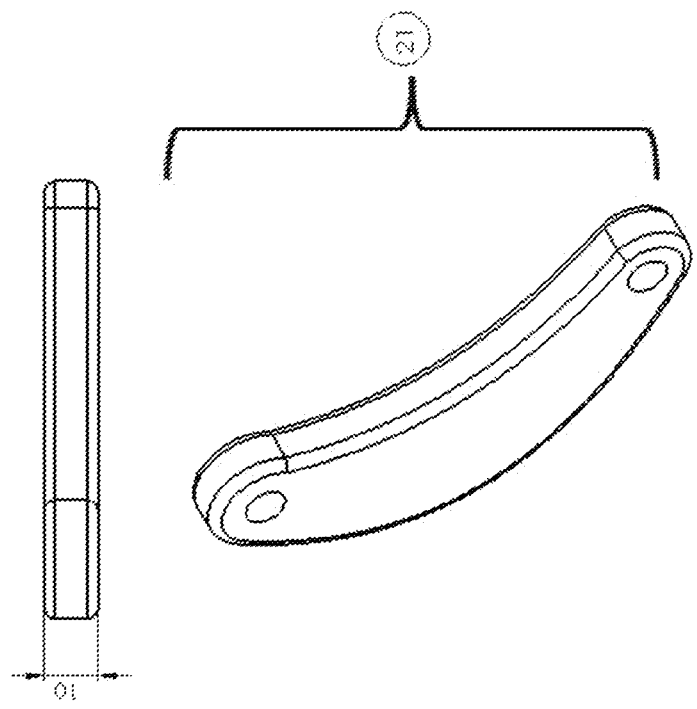
FIG. 8. Illustrates one design for the tensioner component.
Figure 8:
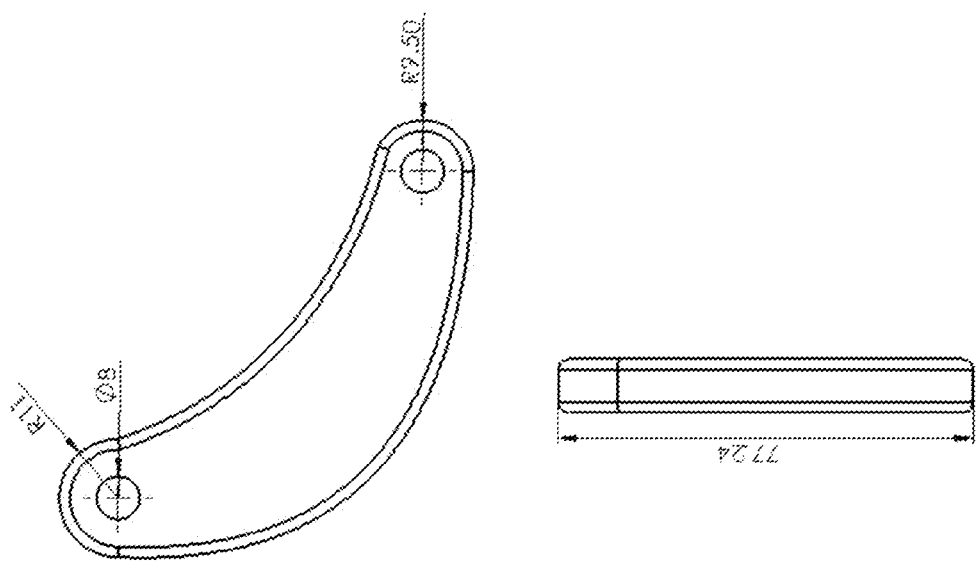

FIG. 5 illustrated various perspectives of an example of tensioner roller 19, which is placed in contact with chain or belt 29 and maintains the appropriate tension. FIG. 6 illustrates various perspectives of an example of tensioner pin 18 that is used couple tensioner roller 19 with tensioner 21. FIG. 7 illustrates various perspectives of an example of tensioner bolt 20 that is used to fasten the tensioner to cover 16. FIG. 8 illustrates various perspectives of an example of tensioner 21.

Figure 9:
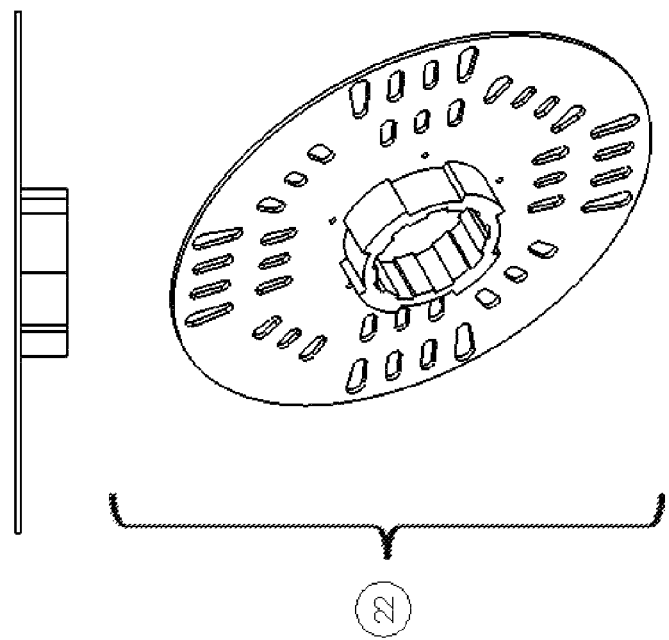
FIG. 9. Illustrates one design for the first sprocket.
Figure 9:
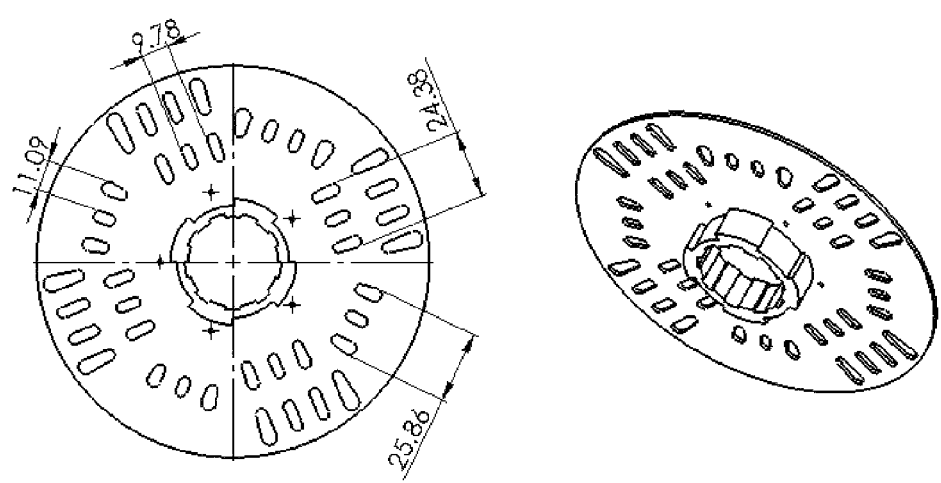
Figure 10:
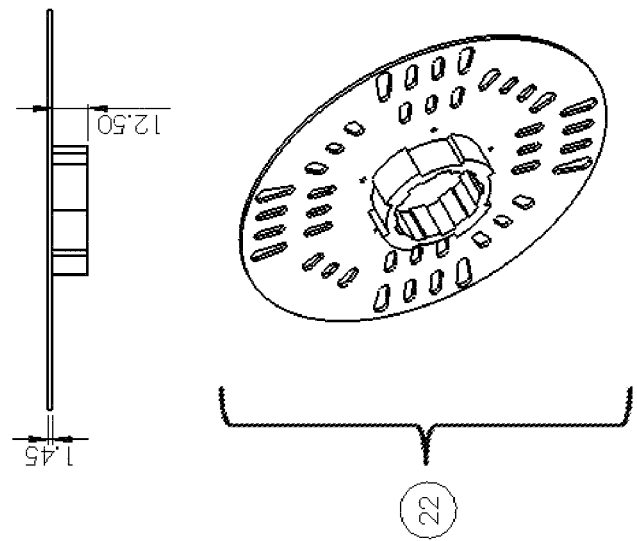
FIG. 10. Illustrates a second view of the first sprocket illustrated in FIG. 9.
Figure 10:
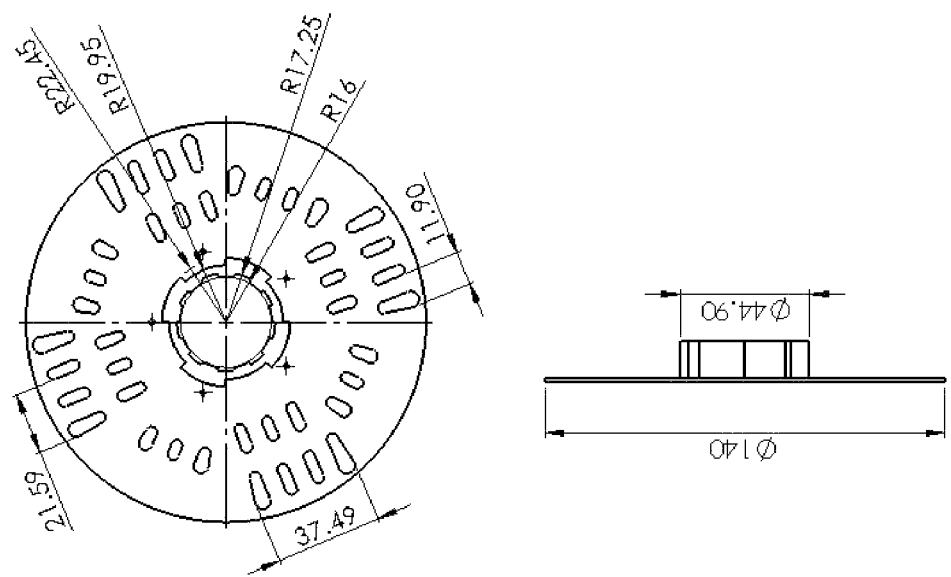
Figure 11:
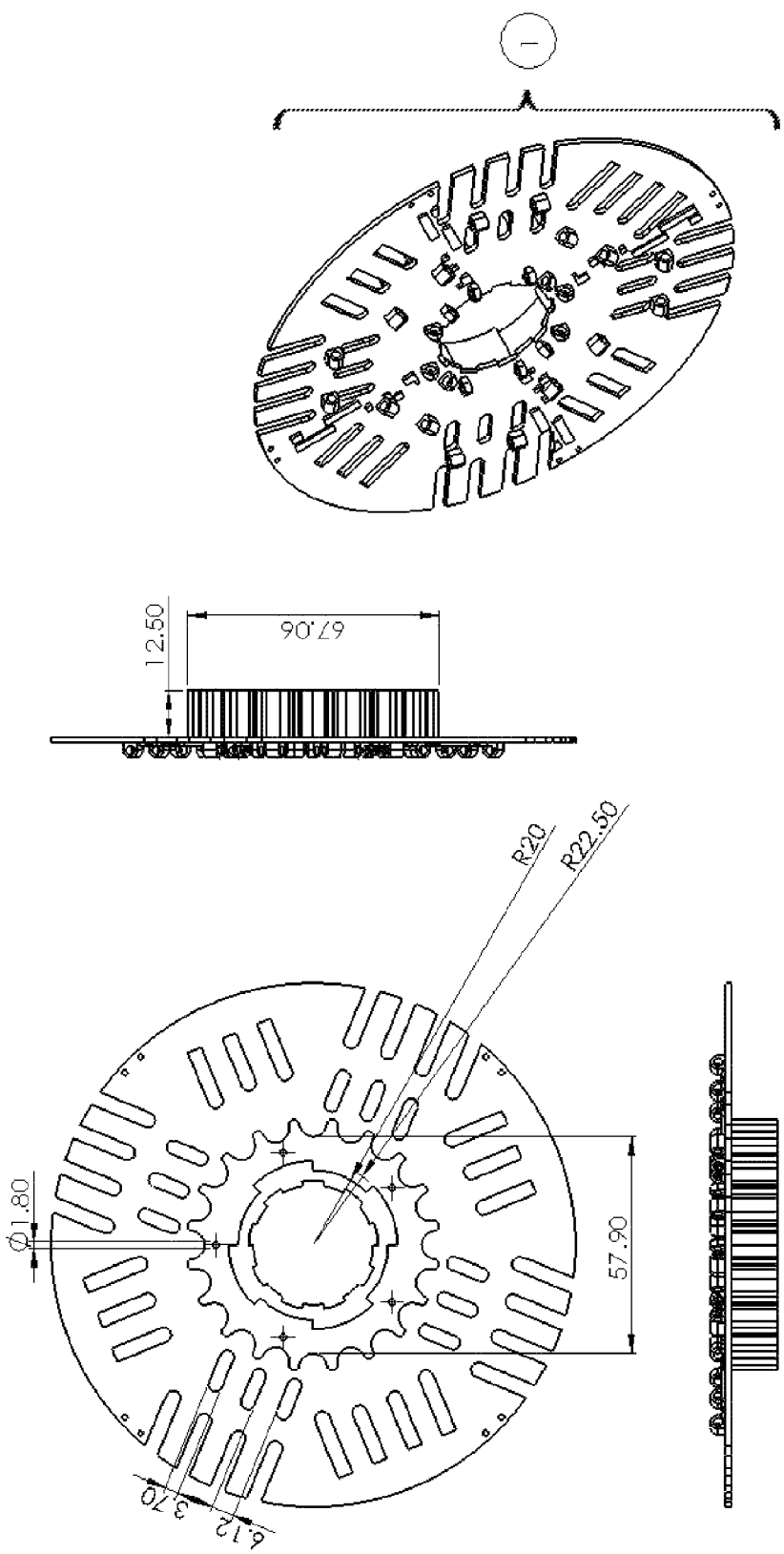
FIG. 11. Illustrates one design for the second sprocket.
Figure 12:
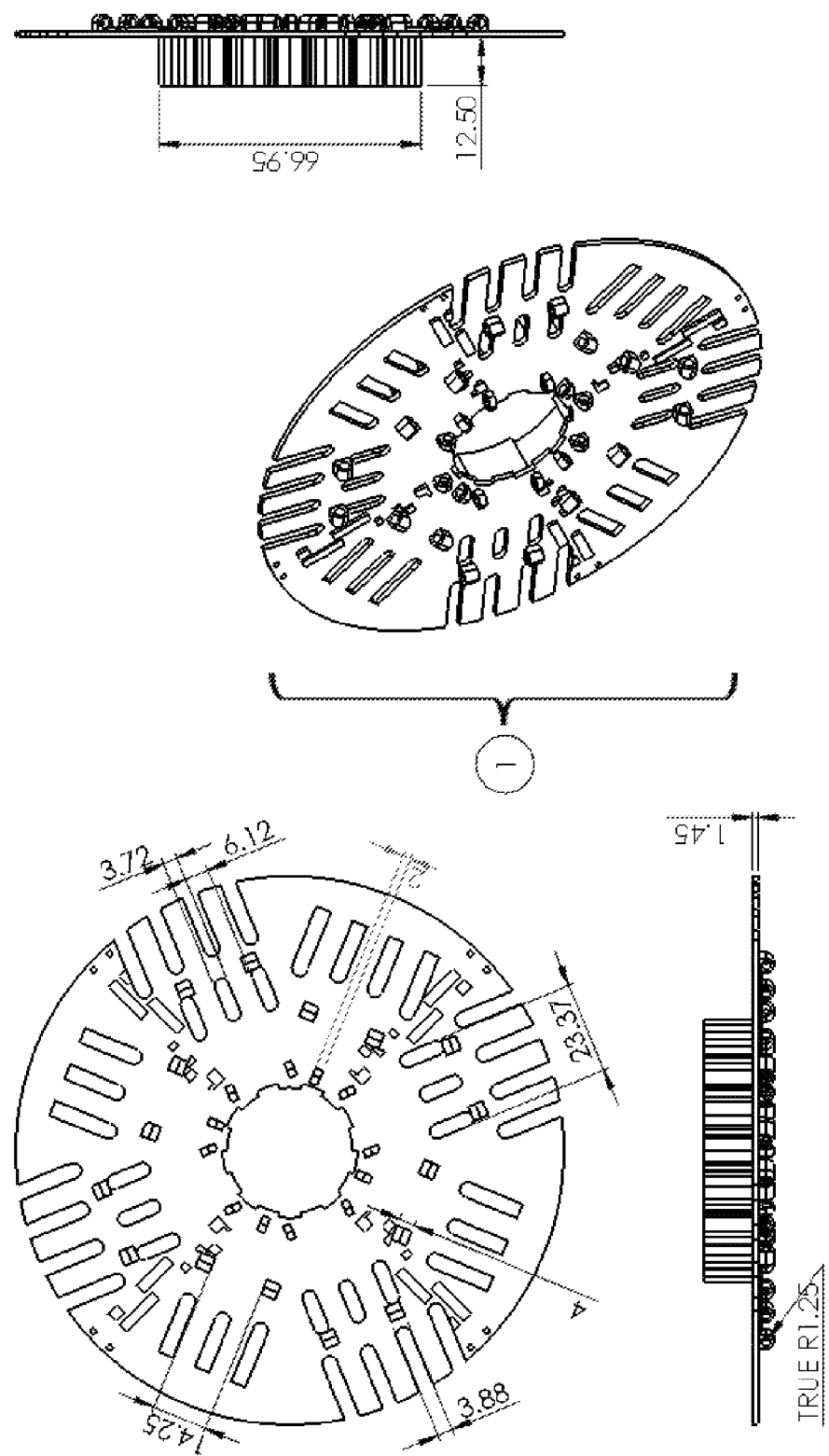
FIG. 12. Illustrates a second view of the second sprocket illustrated in FIG. 11.
Figure 13:
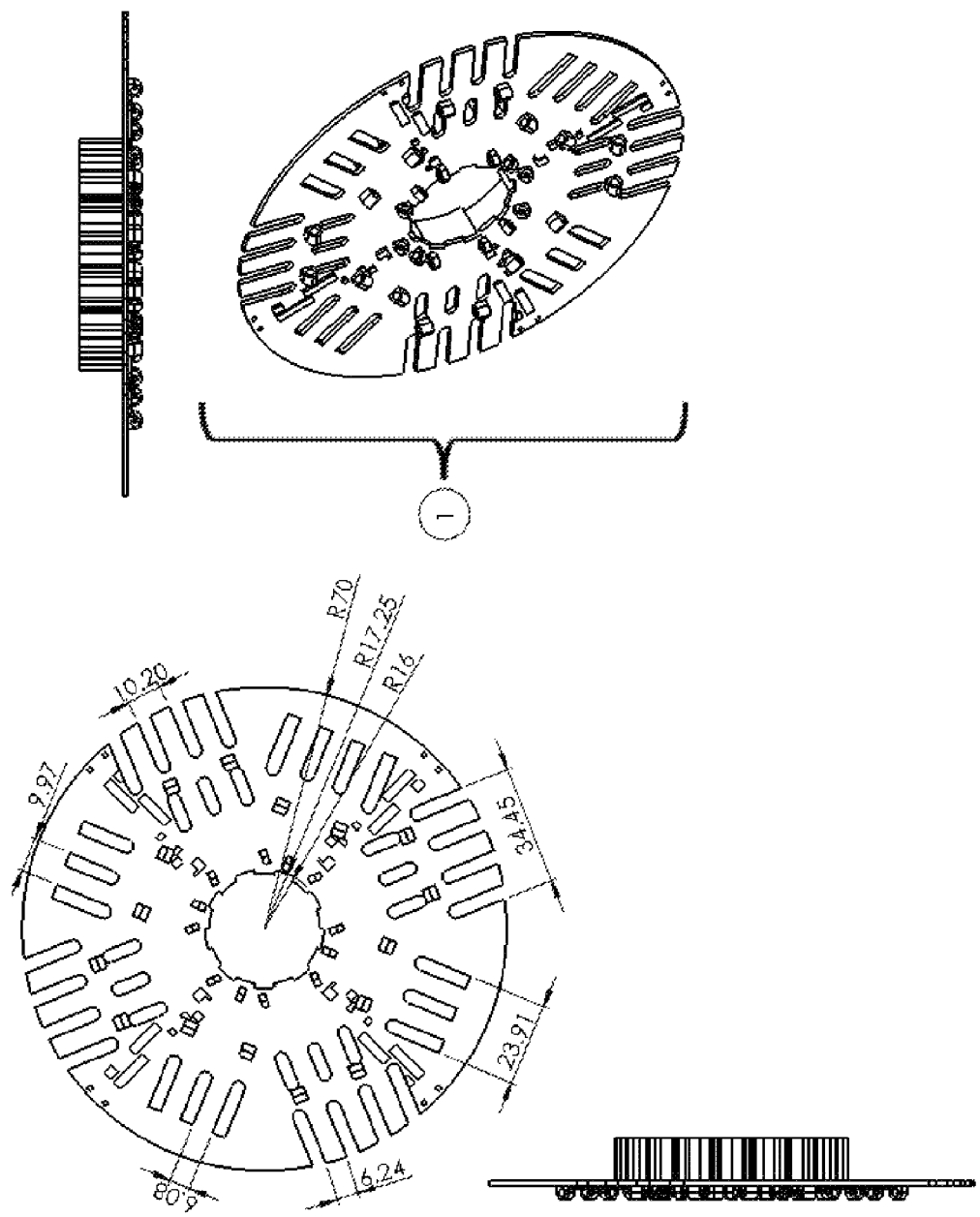
FIG. 13. Illustrates a third view of the second sprocket illustrated in FIG. 11.

FIG. 9 and FIG. 10 illustrate various perspectives of an example of first sprocket 22. FIG. 11, FIG. 12, and FIG. 13 illustrate various perspectives of an example of second sprocket 1.

Figure 14:
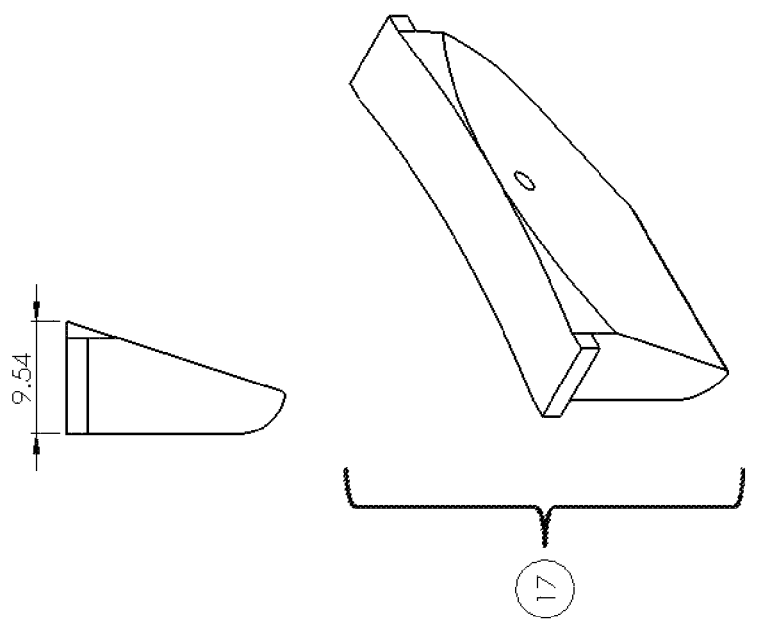
FIG. 14. Illustrates one design for the shifter component.
Figure 14:
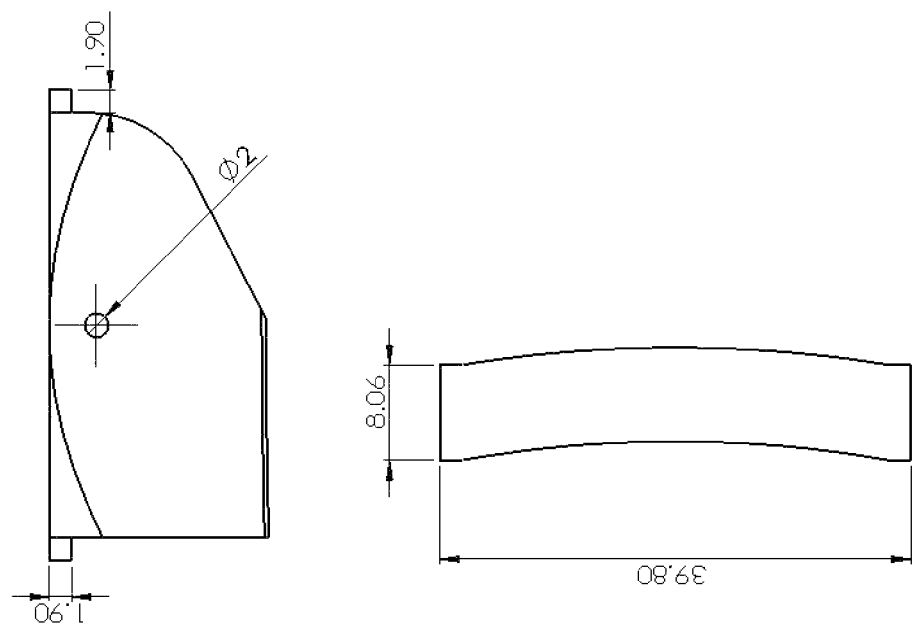
Figure 15:
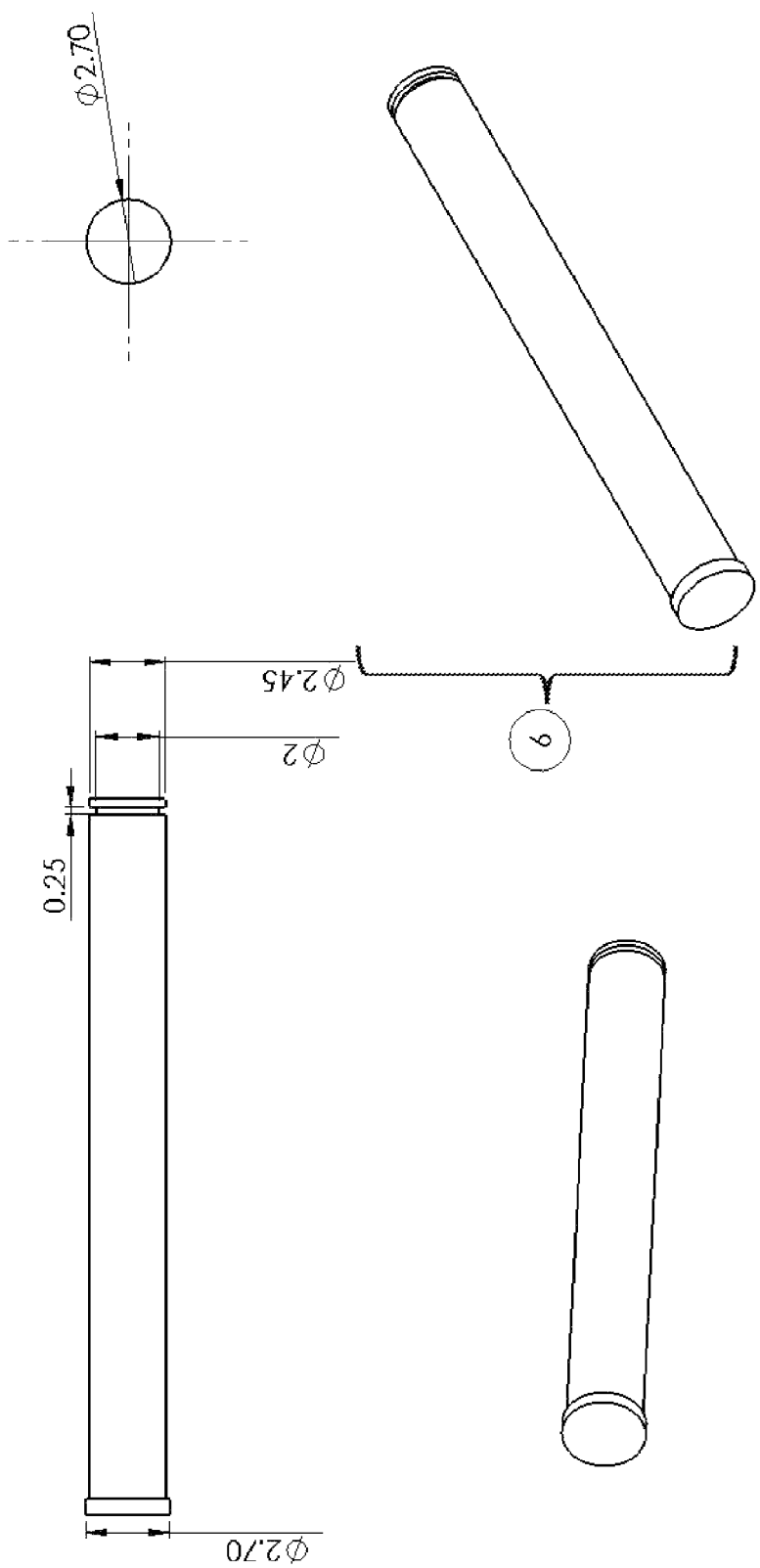
FIG. 15. Illustrates one design for the rod component.
Figure 16:
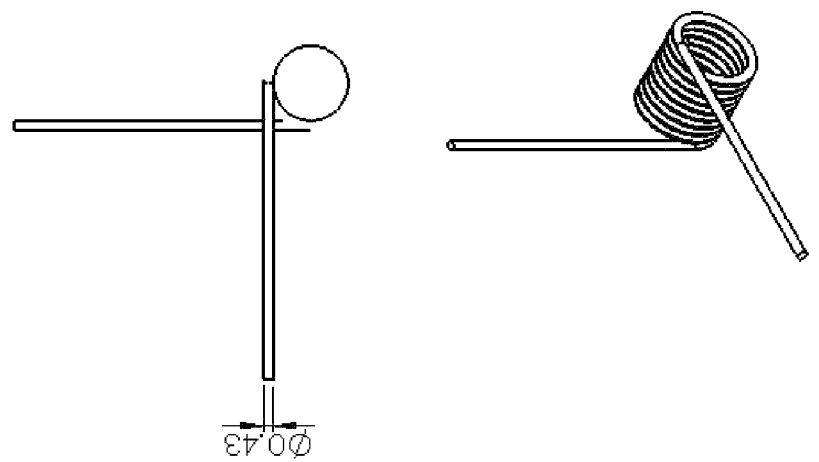
FIG. 16. Illustrates one design for the plate spring.
Figure 16:
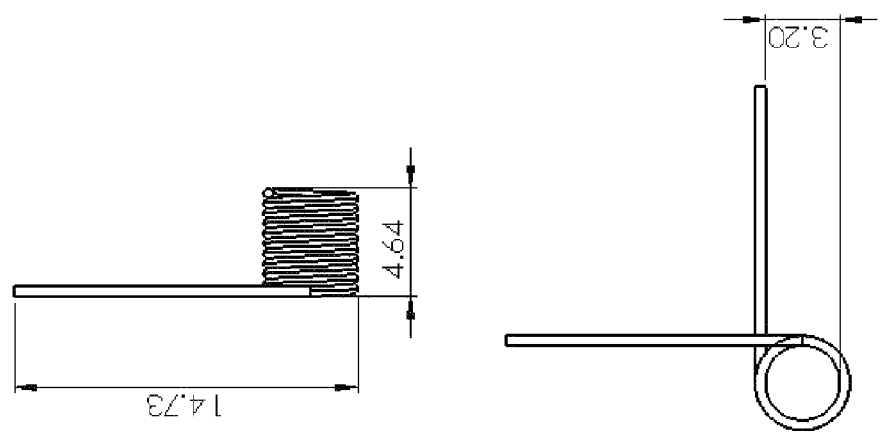

FIG. 14 illustrates various perspectives of an example of shifter 17. FIG. 15 illustrates various perspectives of rod 6, which is used to couple tooth plate 5, 9, or 11 to sprocket 1. FIG. 16 illustrates various perspectives of plate spring, which is operatively coupled to the tooth plate to provide tension towards the disengage configuration. The shifter working in conjunction with the locking bar provides enough force to compress the plate spring and to temporally maintain the tooth plate in an engaged configuration.

Figure 38:
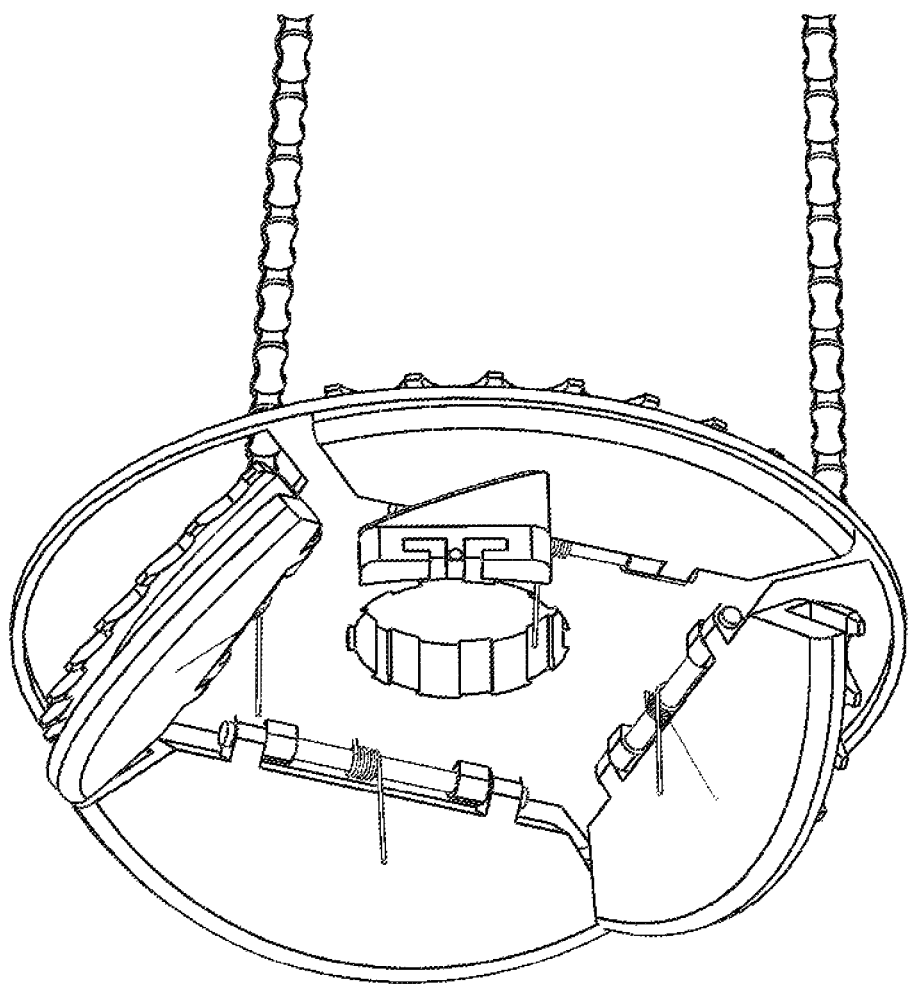
FIG. 38. Illustrates the gear system in mid shift gear in accordance with embodiments of the disclosure.
Figure 39:
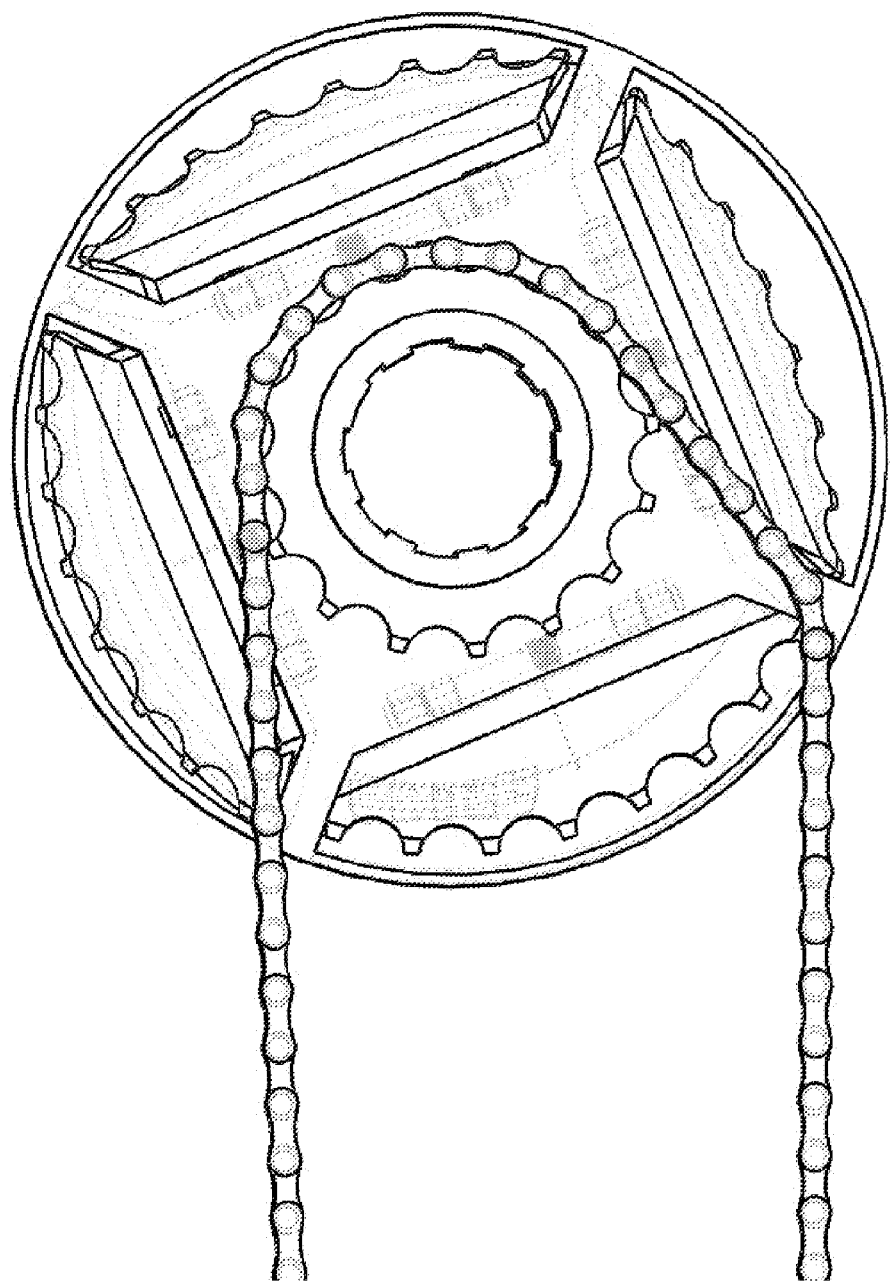
FIG. 39. Illustrates the gear system in mid shift gear shown with wire frame in accordance with embodiments of the disclosure.
Figure 40:
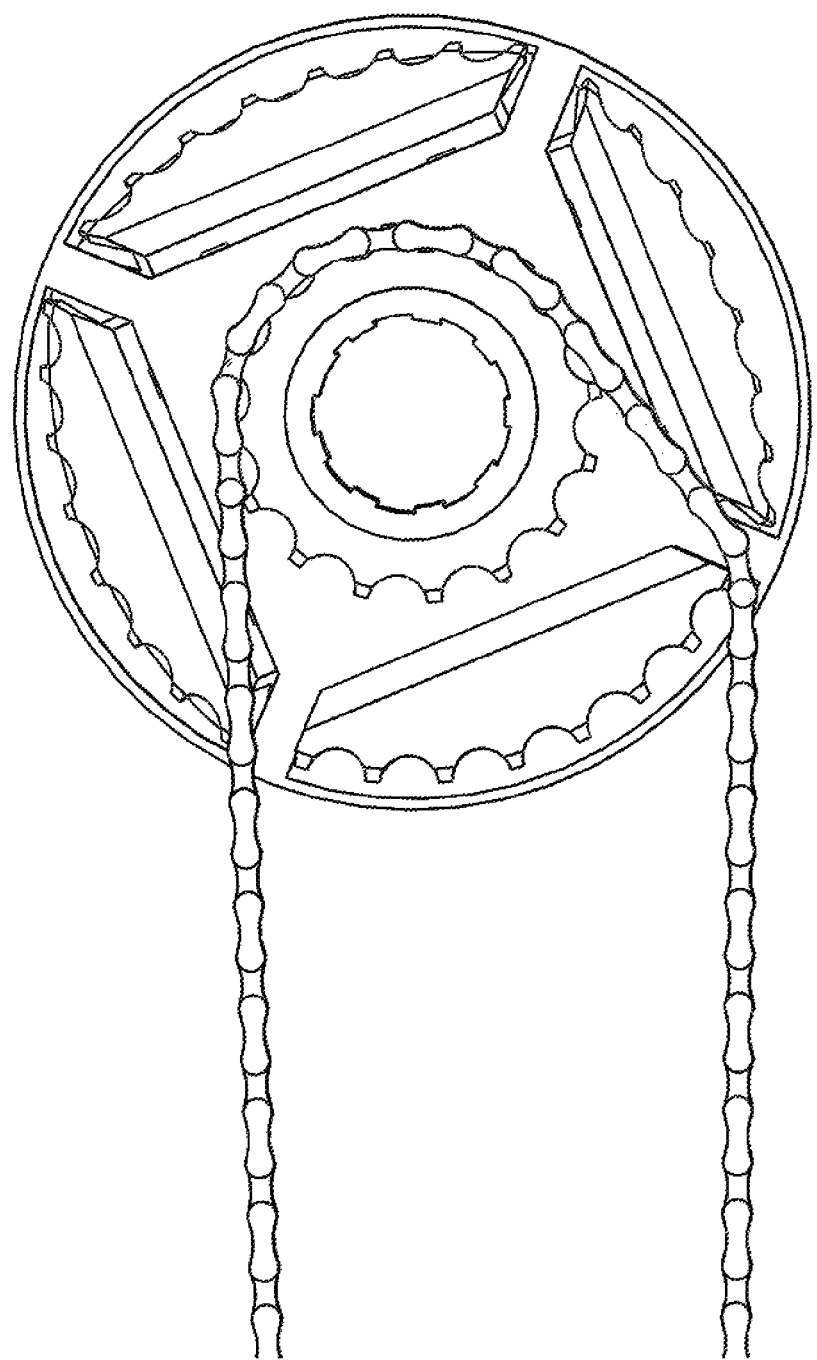
FIG. 40. Illustrates the gear system further in mid shift in accordance with embodiments of the disclosure.
Figure 41:
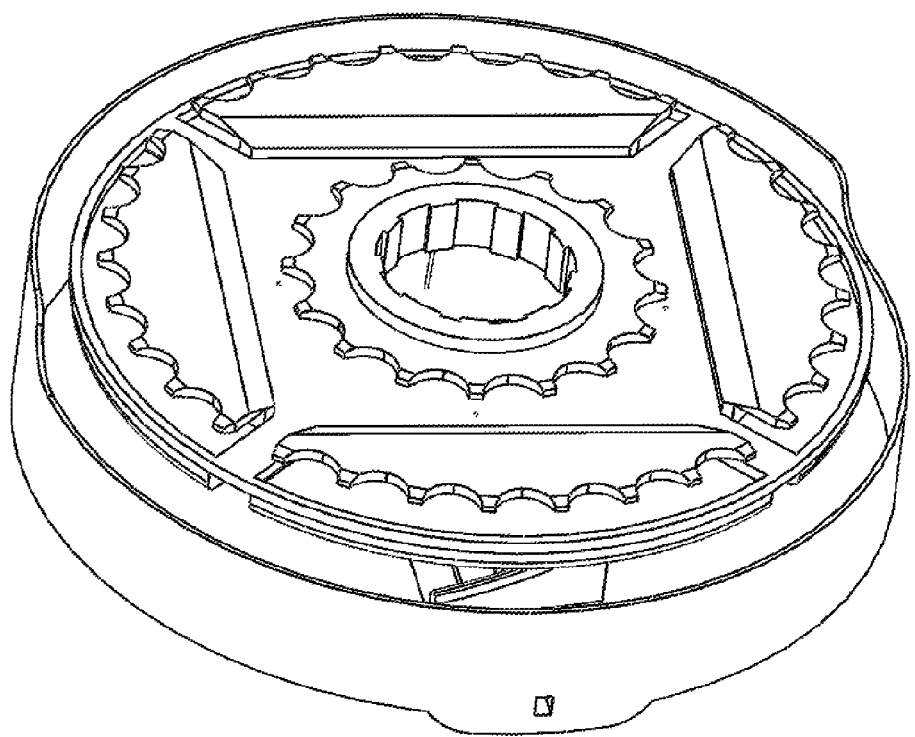
FIG. 41. Illustrates the gear system rear step shifter in accordance with embodiments of the disclosure.
Figure 42:
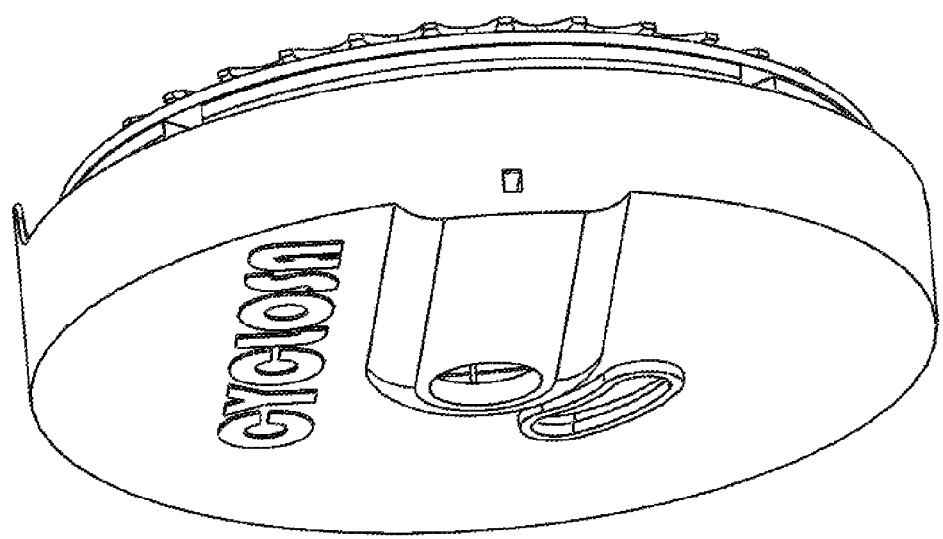
FIG. 42. Illustrates the gear system step shifter in side view in accordance with embodiments of the disclosure.

FIGS. 31-42 illustrate the gear system in operation and configured to be driven by belts and chains. As illustrated in FIG. 38, pegs are utilized to be used with belts and in FIG. 39, teeth are utilized to be used with chains.

Aspects of various embodiments that have been analyzed include: gear ratios, rear wheel speed based on revolutions per minute (RPM), work transmitted to pegs, torque on each component, belt speed, power and pitch line velocity on components, Lewis bending analysis IAW AGMA 908-B89, modified Lewis bending stress IAW AGMA 2001-D04, spring analysis including factor of safety based on $10^5$ cycles, and beam moment and shear diagrams for each gear Springs utilized in certain aspects of the systems or devices described include a plate spring and a shifter spring. In certain aspects the plate springs can actuate in 0.05, 0.06, 0.07, 0.08, 0.10 seconds when cadence is 90 RPMs. In certain aspects, a system or device can include 12 plate springs, 4 locking bar springs, and a shifter spring.

Tooth analysis based on high gear at 30 RPMs results in a shear of 2877 Newtons (N), moment of 34.53 N*M, and a maximum stress of 736 Pa. The analysis was conducted assuming a constant angular velocity, the belt force being applied to the middle of the tooth, and a fixed beam.

The disclosed system and method of use is generally described, with examples incorporated as particular embodiments of the invention and to demonstrate the practice and advantages thereof. It is understood that the examples are given by way of illustration and are not intended to limit the specification or the claims in any manner.

To facilitate the understanding of this invention, a number of terms may be defined below. Terms defined herein have meanings as commonly understood by a person of ordinary skill in the areas relevant to the present invention.

Terms such as "a", "an", and "the" are not intended to refer to only a singular entity, but include the general class of which a specific example may be used for illustration. The terminology herein is used to describe specific embodiments of the invention, but their usage does not delimit the disclosed device or method, except as may be outlined in the claims.

Alternative applications for this invention include using the system and method of use for and device, machinery, or vehicle which requires gears and gears to shift. Consequently, any embodiments comprising a one component or a multi-component system having the structures as herein disclosed with similar function shall fall into the coverage of claims of the present invention and shall lack the novelty and inventive step criteria.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific device and method of use described herein. Such equivalents are considered to be within the scope of this invention and are covered by the claims.

All publications and patent applications mentioned in the specification are indicative of the level of those skilled in the art to which this invention pertains. All publications and patent application are herein incorporated by reference to the same extent as if each individual publication or patent application was specifically and individually indicated to be incorporated by reference.

In the claims, all transitional phrases such as "comprising," "including," "carrying," "having," "containing," "involving," and the like are to be understood to be open-ended, i.e., to mean including but not limited to. Only the transitional phrases "consisting of" and "consisting essentially of," respectively, shall be closed or semi-closed transitional phrases.

The system and/or methods disclosed and claimed herein can be made and executed without undue experimentation in light of the present disclosure. While the system and methods of this invention have been described in terms of preferred embodiments, it will be apparent to those skilled in the art that variations may be applied to the system and/or methods and in the steps or in the sequence of steps of the method described herein without departing from the concept, spirit, and scope of the invention.

More specifically, it will be apparent that certain components, which are both shape and material related, may be substituted for the components described herein while the same or similar results would be achieved. All such similar substitutes and modifications apparent to those skilled in the art are deemed to be within the spirit, scope, and concept of the invention as defined by the appended claims.

What is claimed is:

1. A rear sprocket assembly comprising:
   (a) a first sprocket having an inner and an outer face and a central opening for attachment to a wheel hub;
   (b) a second sprocket having an inner and outer face and a central opening for attachment to a wheel hub;
   (c) at least a first tooth plate having a base and two or more pins, wherein the pins are positioned perpendicular to the base;
   (d) a locking bar having a locking bar stop having an angled head overhang that forms a slot with the base;
   wherein (i) the first and second sprocket are positioned parallel with the inner faces of the first and second sprocket facing each other forming a groove between inner faces of the first and second sprockets; (ii) the second sprocket is operatively coupled to the tooth plate, wherein the tooth plate can be positioned in an engaged position wherein the pins traverse the groove formed between the sprockets by being positioned through openings in the first and second sprockets and a disengaged position wherein the teeth are substantially positioned on the outer face of the second sprocket, the tooth plate being moveable connected to the second sprocket by a hinge and positioned at first distance from the short axis of the first and second sprocket.

2. The assembly of claim 1, further comprising a second tooth plate positioned at second distance from the short axis of the first and second sprockets.

3. The assembly of claim 1, further comprising a fixed gear positioned proximal to the short axis of the sprockets relative to the tooth plate.

4. A gear shifting system comprising:
   (a) the rear sprocket assembly of claim 1 operatively coupled to a cover assembly comprising (i) a removable cover that houses the rear sprocket assembly and is configured to allow a chain or belt to be operatively coupled to the rear sprocket assembly; (ii) a tensioner configured to maintain tension on a chain or belt engaging the rear sprocket assembly, and (iii) a shifter configured to engage and disengage one or more tooth plates of the rear sprocket assembly.

5. A vehicle comprising the assembly of claim 1 or the gear system of claim 4.

6. The vehicle of claim 5, wherein the vehicle is a bicycle or a scooter.

7. A machine comprising the assembly of claim 1 or the gear system of claim 4.

\* \* \* \* \*